(12) United States Patent
Stark

(10) Patent No.: US 7,520,495 B2
(45) Date of Patent: *Apr. 21, 2009

(54) RAPID-ACTION CLAMPING CYLINDER COMPRISING A GUIDING DEVICE

(75) Inventor: Emil Stark, Goetzis (AT)

(73) Assignee: SSA System-Spann AG, Zuerich (CH)

( * ) Notice: Subject to any disclaimer, the term of this patent is extended or adjusted under 35 U.S.C. 154(b) by 0 days.

This patent is subject to a terminal disclaimer.

(21) Appl. No.: 10/553,318

(22) PCT Filed: Apr. 15, 2004

(86) PCT No.: PCT/EP2004/003945

§ 371 (c)(1),
(2), (4) Date: Nov. 29, 2006

(87) PCT Pub. No.: WO2004/091862

PCT Pub. Date: Oct. 28, 2004

(65) Prior Publication Data

US 2007/0063403 A1    Mar. 22, 2007

(30) Foreign Application Priority Data

Apr. 15, 2003    (DE) .................... 103 17 341

(51) Int. Cl.
*B23Q 3/00* (2006.01)
(52) U.S. Cl. .................... 269/309; 269/310
(58) Field of Classification Search ........... 269/309, 269/310, 32, 20; 279/2.06, 2.09; 92/86
See application file for complete search history.

(56) References Cited

U.S. PATENT DOCUMENTS

| 4,577,847 | A | 3/1986 | Schedwin |
| 5,415,384 | A | 5/1995 | Obrist et al. |
| 5,918,870 | A * | 7/1999 | Stark ............... 269/309 |
| 6,532,861 | B2 * | 3/2003 | Etter ............... 92/86 |
| 6,905,117 | B2 * | 6/2005 | Bernhard et al. ....... 269/309 |
| 6,997,448 | B2 * | 2/2006 | Roth et al. ........... 269/309 |
| 2004/0026843 | A1 * | 2/2004 | Roth et al. ........... 269/309 |
| 2004/0256780 | A1 * | 12/2004 | Lang ............... 269/309 |
| 2007/0035076 | A1 * | 2/2007 | Stark ............... 269/309 |
| 2007/0063403 | A1 * | 3/2007 | Stark ............... 269/309 |
| 2007/0063404 | A1 * | 3/2007 | Stark ............... 269/309 |

FOREIGN PATENT DOCUMENTS

| CA | 2 419 090 A1 | 9/2003 |
| DE | 101 23 270 A1 | 11/2002 |
| DE | 202 19 340 U1 | 2/2003 |
| EP | 0 459 544 A2 | 12/1991 |
| EP | 1 344 599 A1 | 9/2003 |
| WO | WO 96/29176 | 9/1996 |

* cited by examiner

Primary Examiner—Lee D Wilson
(74) Attorney, Agent, or Firm—Browdy and Neimark, P.L.L.C.

(57) ABSTRACT

The invention describes a rapid-action coupling cylinder comprising a guiding device for the controlled insertion of a pull-in nipple fixed to the underside of a workpiece pallet into the central receiving aperture in the housing of the rapid-action coupling cylinder. In order to ensure that the pull-in nipple is inserted into the central receiving aperture in the housing without damage, provision is made by the invention for the face end of the pull-in nipple to have, in the direction of insertion, a conical bevel that is beveled towards the rear and cooperates with an associated—oppositely beveled—conical receptacle inside the housing of the rapid-action coupling cylinder.

15 Claims, 17 Drawing Sheets

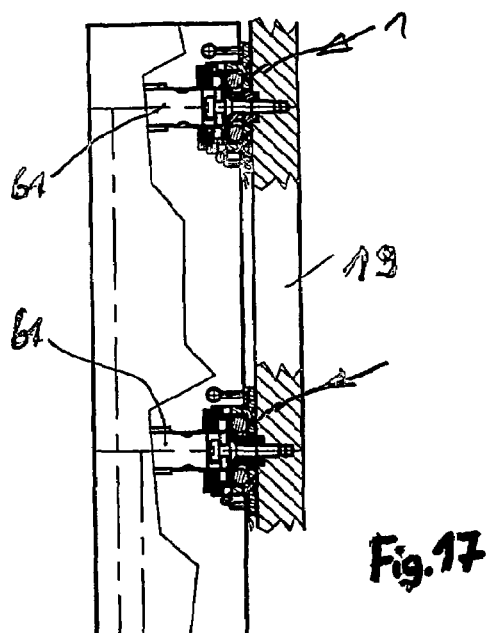
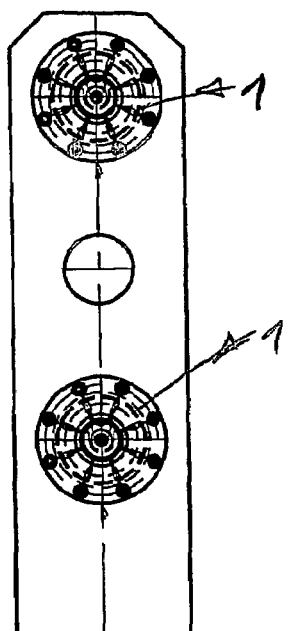
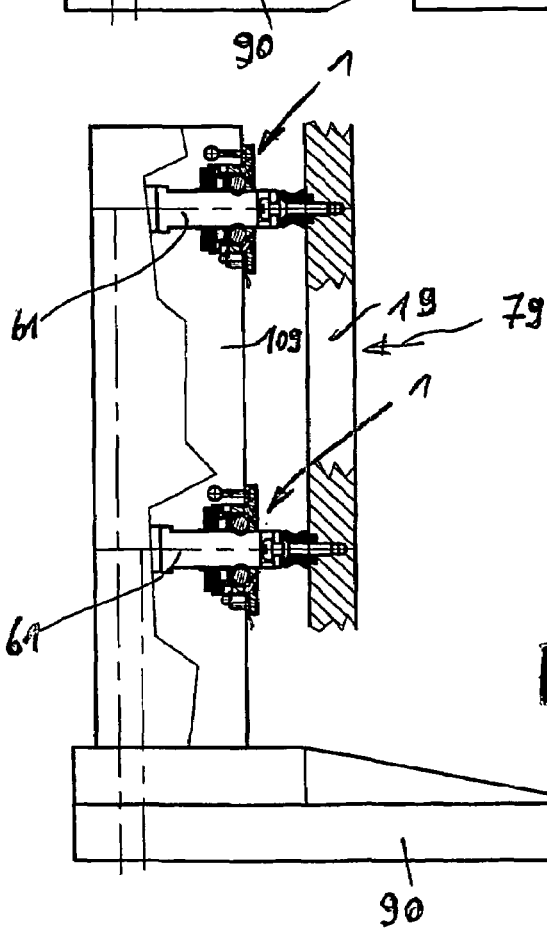
Fig. 17
Fig. 18
Fig. 16

RAPID-ACTION CLAMPING CYLINDER COMPRISING A GUIDING DEVICE

BACKGROUND OF THE INVENTION

1. Technical Field of the Invention

The invention relates to a rapid-action clamping cylinder.

2. Prior Art

A rapid-action clamping cylinder comprising a piston-operated pull-in nipple has already become known with the applicant's DE 101 23 270 A1. Disposed inside the housing of the rapid-action clamping device of that patent document was a lifting piston that was actuated in the central center recess of the rapid-action clamping cylinder such that is could pass through the locking device. The object of this measure was to move the lifting piston out of the central receiving aperture in the rapid-action clamping cylinder far enough to permit the pull-in nipple that was disposed on the underside of the workpiece pallet to be placed gently on top of the lifting piston, in order to thus be able to insert the pull-in nipple preferably without any damage into the interior of the rapid-action clamping cylinder.

In that embodiment, however, a full protection of the pull-in nipple against damage inside the center recess was not yet guaranteed. On one hand, a centering correspondence was lacking between the pull-in nipple and the upper side of the lifting piston because the two parts sat on each other only with flat stop faces in each case. On the other hand, the pull-in nipple was designed such that it was executed flat toward the receiving aperture so that an offset allowance of only 2.5 mm was allowed between the corresponding parts. The pull-in nipple could be offset only within the range of the offset allowance in order to still be able to enter into the central receiving aperture in the rapid-action clamping cylinder.

The offset allowance, however, was too small for most applications. It could therefore happen that the pull-in nipple—especially if it was fixed to heavy workpiece pallets—was offset by more than the offset allowance due to the weight of the workpiece pallet, and the nipple was lowered onto the cover of the rapid-action clamping cylinder offset from the receiving aperture. This meant a significant risk of damage. Additionally, the workpiece pallet had to be maneuvered with the hoisting equipment in such a way that the pull-in nipple would enter into the central receiving aperture of the rapid-action clamping cylinder.

If the pull-in nipple was placed down only slightly offset from the central receiving aperture in the rapid-action clamping cylinder, the lifting piston would be moved back into the central receiving aperture of the rapid-action clamping cylinder by a machine command during the continued insertion process, with the aim of lowering the pull-in nipple along with it. However, since the same sat on the receiving aperture of the rapid-action clamping cylinder slightly offset, it would drop into the central receiving aperture in a jerky movement. This was no longer a gentle insertion process. In the case of an undesired operational situation of this kind, it was possible that even the receiving aperture on the rapid-action clamping cylinder could become damaged.

Especially in the case of very large workpiece pallets with dimensions of up to 1 meter by 2 meters and a corresponding weight in the range of tons, it was difficult to lower pull-in nipples of this type by crane into the central receiving aperture in the rapid-action clamping cylinder without damage via a relatively small-tolerance inlet diameter. The insertion process was also made difficult, in particular because a visual monitoring was no longer easily possible in the case of workpiece pallets of that size. The pull-in nipples can be seen only with difficulty on the underside of the large workpiece pallet and a controlled insertion of the pull-in nipples into the barely visible insertion openings was not possible through visual monitoring.

OBJECT AND SUMMARY OF THE INVENTION

The invention is therefore based on the object of improving and facilitating a controlled, safe and damage-free lowering of pull-in nipples into the central aperture of rapid-action clamping cylinders.

To meet this object, the invention is characterized in that the face end of the pull-in nipple, which corresponds to the lifting piston, has conical bevels that cooperate with associated conical bevels on the upper side of the lifting piston.

By that, an improved guiding device for the pull-in nipple is proposed, which will therefore be referred to as "capturing device" in the following description, since the pull-in nipple is literally "captured" via a large lateral offset allowance.

In a preferred embodiment of the invention, provision is made for the face end of the pull-in nipple to have conical bevels that are beveled toward the rear so that a conical tip cooperates with an associated—oppositely beveled conical recess in the lifting piston.

In another embodiment of the invention, provision is made for a conical indentation to be provided in lieu of a conical tip, in a kinematic reversal, which cooperates with an associated conical tip on the upper side of the lifting piston.

In the first mentioned embodiment (conical tip on the face end of the pull-in nipple), the advantage is achieved that a 400% larger capturing path of the pull-in nipple into the insertion opening on the rapid-action clamping cylinder is provided, as compared to the prior art.

Due to the conically beveled tip, the pull-in nipple can now move into the central receiving aperture in the rapid-action clamping cylinder over the entire—relatively small—face end, resulting in an offset path of, for example, 12.5 mm, as compared to a conventional offset path of 2.5 mm according to DE 101 23 270 A1.

This offset path of 12.5 mm is provided to all sides leading out from a central center line, whereas in the prior art, a misalignment of only maximally 2.5 mm was possible in any direction.

The above object of permitting a damage-free insertion of a pull-in nipple into a central receiving aperture in a rapid-action locking cylinder is also met with the additional technical teaching that, in the region where the pull-in nipple and lifting piston meet, the contacting and associated surfaces are kept free from contaminations.

For this purpose the invention first provides for the lifting piston to have disposed in it blowing-air openings or cooling agent openings, which are directed towards the associated surfaces of the pull-in nipple. With these measures it is possible to completely clean and dry the associated surfaces (of pull-in nipple and lifting piston) before they make contact, without the risk of cooling agent or shavings becoming trapped there. When cleaning with a cooling agent, this requires that the same is completely free of shavings and filtered to a sufficiently high degree in order to achieve the desired cleaning purpose.

In a further development of the characteristic feature aimed at meeting the above object, provision is made for the lifting piston to have disposed in it a turbine wheel driven in rotation, which is supplied with air by means of a compressed-air flow. As soon as the lifting piston has been moved up and out of the central receiving aperture in the rapid-action clamping cylinder, this turbine wheel comes into a position approximately opposite the cover surface area of the rapid-action clamping cylinder and the high-turbulence airflow that is then generated blows the entire cover surface area clean, which also serves to meet the above object of permitting a damage-free insertion of the pull-in nipple into the center recess of the rapid-action clamping cylinder. Shavings and contaminations can no longer deposit in this region, which would otherwise have resulted in damage to the pull-in nipple during its insertion into the central receiving aperture of the rapid-action clamping cylinder.

The invention, in another embodiment, also proposes that the workpiece pallet does not sit flat and level with its underside on the corresponding top surface of the cover of the rapid-action clamping cylinder, but instead forms an intermediate space created by support discs, which are affixed by means of screws to the underside of the workpiece pallet. In this manner a gap is created between the underside of the workpiece pallet and the top surface of the cover of the rapid-action clamping cylinder, and this gap also has compressed air flowing through it in order to thus prevent shavings from depositing in this region and preventing a centered placement of the workpiece pallet onto the rapid-action clamping cylinder.

Described above were various possible solutions as to how to permit a controlled and damage-free insertion of the pull-in nipple—which is fixed to the underside on the workpiece pallet—into the center recess of a rapid-action clamping cylinder.

In the following description of the invention, it is now proposed, as an additional proposed solution, that even when rapid-action clamping cylinders of this type are arranged on horizontal processing towers (horizontal installation), or even in the case of an overhead installation, it is now possible for the first time to also permit a controlled insertion of the pull-in nipples of workpiece pallets into the center recess of rapid-action clamping cylinders in these extreme processing situations.

The invention proposes for this purpose that a capturing device is provided between the pull-in nipple and the lifting piston arranged inside the rapid-action clamping cylinder.

In a first example embodiment of this example embodiment, provision is made for the capturing device to substantially consist of a capture screw that is connected to the pull-in nipple and that forms a capture head, which is insertable in a controlled manner into an associated capturing element connected to the lifting piston.

The use of a capturing device of this type has particular advantages in cases in which the rapid-action clamping cylinders are not arranged horizontally on a mounting table or clamping plate, but in which the rapid-action clamping cylinders are arranged at an angle of 90° in a horizontal processing tower.

While in the first embodiment, the center transverse axis of the rapid-action coupling cylinders is oriented vertically and perpendicular to a horizontal surface of a machine table, in the second embodiment the center longitudinal axis through the rapid-action coupling cylinder is aligned horizontally, and the workpiece pallets with the pull-in nipples disposed thereon and the additional capturing device are hooked into the horizontally aligned rapid-action coupling cylinders, relieved of their load, and then pulled in.

A capturing device of this type may be disposed as a separate element in each individual rapid-action coupling cylinder, each rapid-action coupling cylinder having arranged in it a lifting piston on which the capturing device is fixed, which cooperates with the corresponding capturing device on the pull-in nipple.

In another, expanded embodiment according to this proposed solution, provision is made for heavy and large workpiece pallets to be pulled in controlled quasi automatically and synchronously in a row of rapid-action coupling cylinders that are arranged parallel with each other. For this purpose provision is made for the individual lifting pistons of the rapid-action coupling cylinders with the capturing device attached thereto to be linked to each other synchronously by means of a mechanical rod assembly, so that all lifting pistons are operated synchronously by means of a single rod assembly, and a synchronous pulling-in movement thus occurs by means of the described capturing device.

Different proposed solutions exist in this context for the synchronous displacement drive of the individual lifting pistons inside the individual rapid-action coupling cylinders.

In a first proposed solution, it is proposed that each lifting piston is connected to a toggle-joint rod assembly and that all toggle-joint rod assemblies are coupled with a dual-action piston arrangement, so that when a single drive cylinder is actuated, all toggle joints are actuated accordingly.

It is particularly important in this context that the hydraulic actuation of the dual-action cylinder takes place through the machine control unit itself, i.e., the compressed oil feed to this drive cylinder takes place in a correspondingly controlled manner in dependence upon the compressed oil feed to the individual rapid-action coupling cylinders, so that a controlled sequence of operation is guaranteed.

In lieu of providing a hydraulically actuated drive cylinder for the displacement drive of the lifting pistons, it is also possible, of course, to use a pneumatic drive or a manual drive, wherein a toothed rack may also be used in place of the drive having a dual-action hydraulic piston.

In the case of simpler centering tasks, it is not absolutely necessary that a synchronous drive be provided for all lifting pistons inside the rapid-action coupling cylinders. A passive pull-in means may be provided instead, which means that the lifting pistons inside the rapid-action coupling cylinders can be moved back and forth by hand, namely via the movement on the workpiece pallet itself. The workpiece pallet may therefore be hooked onto the lifting piston with the capturing device engaged to it, and the workpiece pallet is then [ ]¹ into the central receiving aperture by hand, and the individual lifting pistons are passively moved in a synchronized manner into the interior of the rapid-action coupling cylinder through the movement of the workpiece pallet.

The same process, of course, also takes place in the opposite manner when the workpiece pallet is disconnected from the rapid-action coupling cylinders. In this case, too, the workpiece pallet—with unlocked rapid-action coupling cylinders—is simply pushed off the rapid-action coupling cylinders and the lifting pistons passively follow this pull-out movement until the capturing device is free and the pull-in nipples can be unhooked from the capturing device.

In an additional embodiment of the invention, the inventive idea according to the above-mentioned example embodiment will be generalized in such a way that it is now no longer necessary to arrange lifting pistons inside a rapid-action coupling cylinder in a manner so that they are displaceable.

In this generalization, provision is made for the lifting piston to be replaced with a general machine part, particularly a machine shaft, that is held displaceable in the interior of a rapid-action coupling cylinder. In this example embodiment, multiple locking grooves may be provided on the machine shaft at an axial distance from each another, which cooperate with the locking means inside the rapid-action coupling cylinder. In this manner it is now possible for the first time to implement a precisely positioned shifting and corresponding highly precise locking of a machine shaft in a rapid-action coupling cylinder, since this machine shaft is positioned perfectly and in a highly precise manner during the engagement of the locking means into the locking groove on the machine shaft.

The machine shaft is therefore held in the rapid-action coupling cylinder with a very high degree of holding force and may be used for various machine tasks. The machine shaft may, for example, be a part of a displacement rod assembly or part of a closing unit, or part of a hydraulic piston where it is important to lock this hydraulic piston in a certain axial displacement position with a high degree of accuracy.

In a further development of this generalizing idea, provision is made for two opposite rapid-action coupling cylinders to act on the machine shaft at a mutual distance from each another, whose pull-in force is directed in an opposite direction in each case. The pull-in force of the one rapid-action coupling cylinder on the one locking groove of the machine shaft acts against the pull-in force of the opposed rapid-action coupling cylinder. In this manner the machine shaft is positioned in two opposite directions between two rapid-action coupling cylinders that are biased in opposite directions and can withstand very high displacement forces without resulting in an undesired releasing of the locking means.

All information and features revealed in the documentation, including in the abstract, particularly the dimensional embodiment presented in the drawings, are claimed as essential to the invention to the degree that they are novel as compared to the prior art, either individually or in combination with each other.

The invention will be explained in more detail below, based on a number of implementation approaches. Additional features and advantages that are essential to the invention will become apparent from the drawings and their description.

BRIEF DESCRIPTION OF THE DRAWINGS

In the drawings:

FIG. 16: shows a section in a side view through a capturing device comprising a passively displaceable lifting piston;

FIG. 17: shows the illustration according to FIG. 16 in the moved-in condition;

FIG. 18: shows a top view of the front face of the arrangement according to FIGS. 16 and 17;

DETAILED DESCRIPTION OF THE PREFERRED EMBODIMENT OF THE INVENTION

Figure 1:
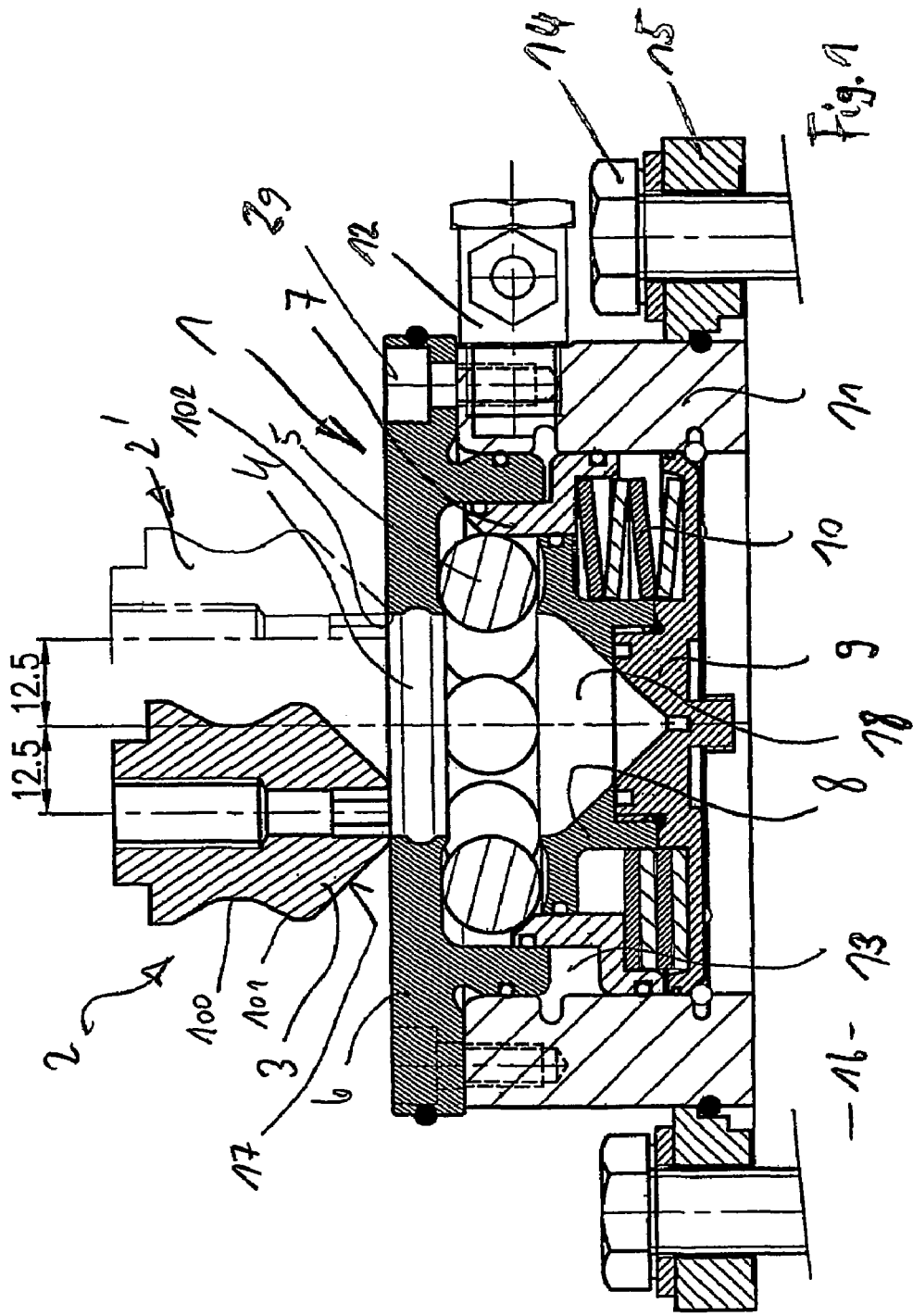
FIG. 1: shows a section through a first embodiment of a pull-in device with enlarged capturing path.

In FIG. 1, a rapid-action coupling cylinder 1 is depicted in general, which is described in detail in a number of applications of the present applicant's. The description there shall be considered fully incorporated into the scope of the description of the present invention.

The rapid-action coupling cylinder 1 substantially consists of a cover 6 placed upon a tubular housing 11 and secured by means of screws 29.

Provided in the cover 6 is a central receiving aperture 4, into which a pull-in nipple 2 is to be inserted in a controlled manner and preferably without damage.

Disposed in the interior of the rapid-action coupling cylinder 1 is a locking means that substantially consists of locking balls 5 guided without cage that are evenly distributed over the circumference and that are arranged evenly distributed on horizontal ball bearing support surfaces of a ball bearing cup 8 so as to be displaceable in the radial direction.

The displacement drive of the balls in the locking direction is provided in this case by means of a series of spaced-apart springs 10 that are disposed in the intermediate space between the ball bearing cup 8 and a lower spring support 9. The springs 10 act upon an annular piston 7 that is bent at right angle, which is hydraulically movable into is release position and by the spring force of the springs 10 into its locking position.

The right half of the section according to FIG. 1 depicts the locking position, whereas the left half of the section depicts the release position of the rapid-action coupling cylinder 1.

Through a pressurized-agent port 12 the pressurized agent is introduced into a pressure chamber 13 and moves the piston 7 in a downward direction according to the half section on the left, causing the locking balls 5 to be released and to move out of engagement with an associated locking groove 100. There, the balls 5 are otherwise locked in the region of a downwardly oriented incline 101.

For the sake of completeness, it should be mentioned that the housing 11 is secured by means of clamping brackets 15 and associated screws 14 to a horizontally positioned machine table 16 that is not depicted in detail.

In order to now insert the pull-in nipple 2 preferably without damage into the central receiving aperture 4 of the rapid-action coupling cylinder 1, provision is made according to the invention for the pull-in nipple 2 to incorporate a capture tip 3 that is preferably implemented with conical bevels 17. Based on the arrangement of these conical bevels 17 on the capture tip 3, it is now possible to move the pull-in nipple 2 over an offset path of altogether 12.5 mm offset from the receiving aperture 4 to this receiving aperture 4 and still enter into the receiving aperture 4. For this purpose the receiving aperture has disposed on its inner circumference an inlet radius 102 that cooperates with the conical bevel 17 of the capture tip 3.

It is also important in the example embodiment according to FIG. 1 that the central interior space inside the housing of the rapid-action coupling cylinder, namely especially the upper ball bearing cup 8 and the lower spring support 9, also form a conical receptacle 18 so that in the locked position the capture tip 3 engages in the region of this conical receptacle 18 but remains free there.

Figure 2:
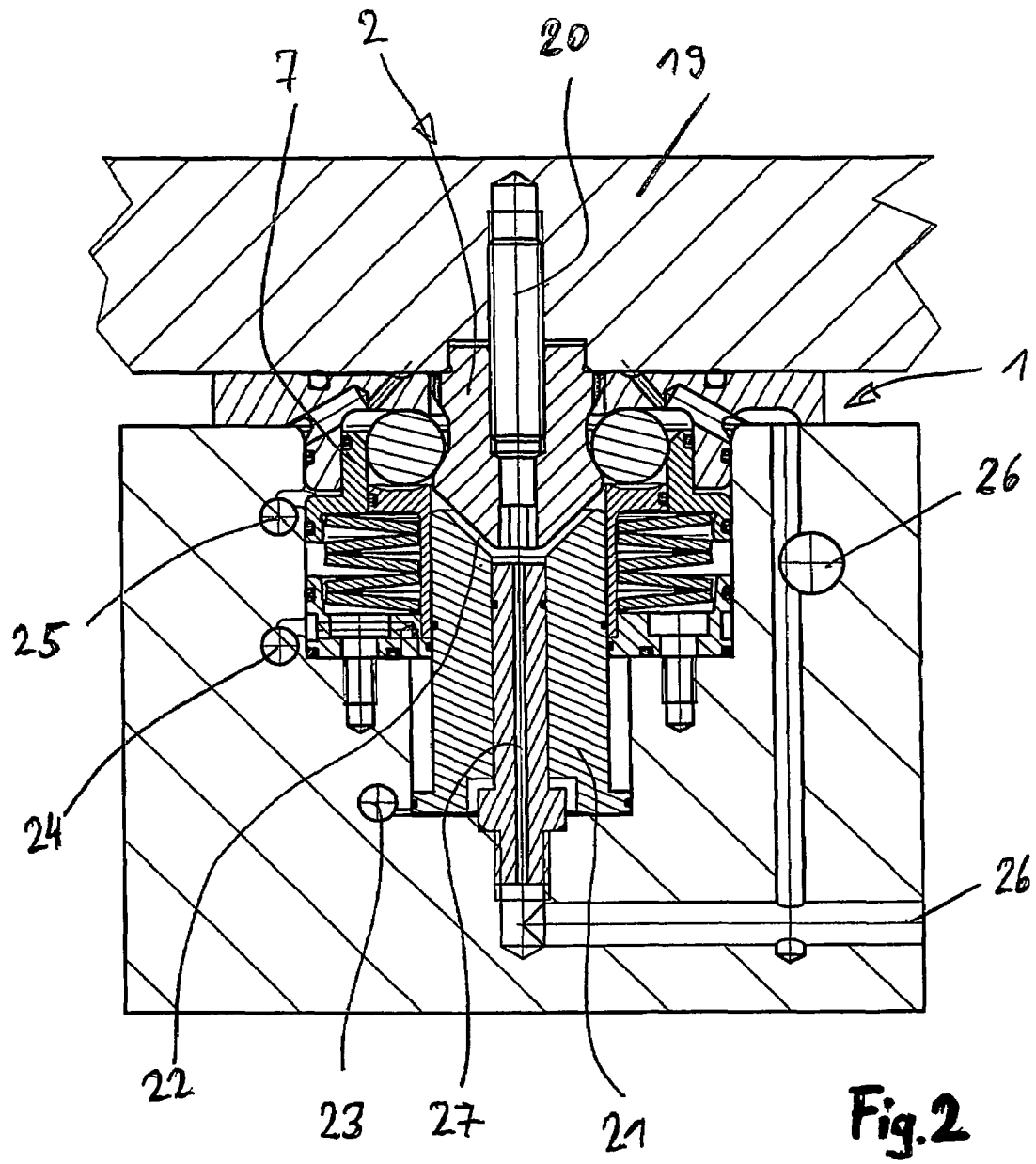
FIG. 2: shows an embodiment that has been modified from FIG. 1, comprising an additional lifting piston.

FIG. 2 shows an example embodiment that has been modified from FIG. 1, wherein in the central interior space of the rapid-action coupling cylinder, no conical bevel is disposed in the region of the parts 8, 9, but a displaceably driven lifting piston 21 that now also has an associated conical recess 22 on its upper face end.

This lifting piston 21, in the pull-in position, moves out of the cover 2 in an upward direction, and the conical recess 22 is then directed upward, as will be explained in more in more detail, for example, based on the example embodiment according to FIG. 5.

In the example embodiment according to FIG. 2 it is important that corresponding blowing-air channels in the interior of the rapid-action coupling cylinder 1 are supplied via the port 26 for blowing air, so that the blowing air escapes from the cover 6 at various types of locations.

The blowing air is also moved through the interior of the lifting piston 21 and reaches, via an ascending channel 27, the region of the conical recess 22 which, accordingly, is also kept free from contaminations, especially shavings.

Through the port 25, a pressurized medium is introduced and the piston 7 is moved in a downward direction into its unlocked position.

Through the port 24, the pressurized-agent is supplied for the displacement drive of the lifting piston 21 in the sense of a lowering movement, whereas, if pressurized medium is introduced via the port 23, the lifting piston 21 is moved vertically up and out of the central interior recess of the rapid-action coupling cylinder 1.

The advantage of a conical recess 22 in the upper front face of the lifting piston 21 lies in that the pull-in nipple 2 is reliably captured with its conical tip in the conical recess 22 over a very large offset path and reliably guided into the center region, where it is centered. This ensures that, when the lifting piston 21 is inserted into the central center recess, the capture tip 3 lies reliably centered in the conical recess 22, and any circumferential elements of the pull-in nipple 2 are thus prevented from impacting against the outer circumference of the central receiving aperture.

For the sake of completeness, FIG. 2 shows that the pull-in nipple 2 is fixed by means of a locking screw 20 to the underside of a workpiece pallet 19.

Figure 3:
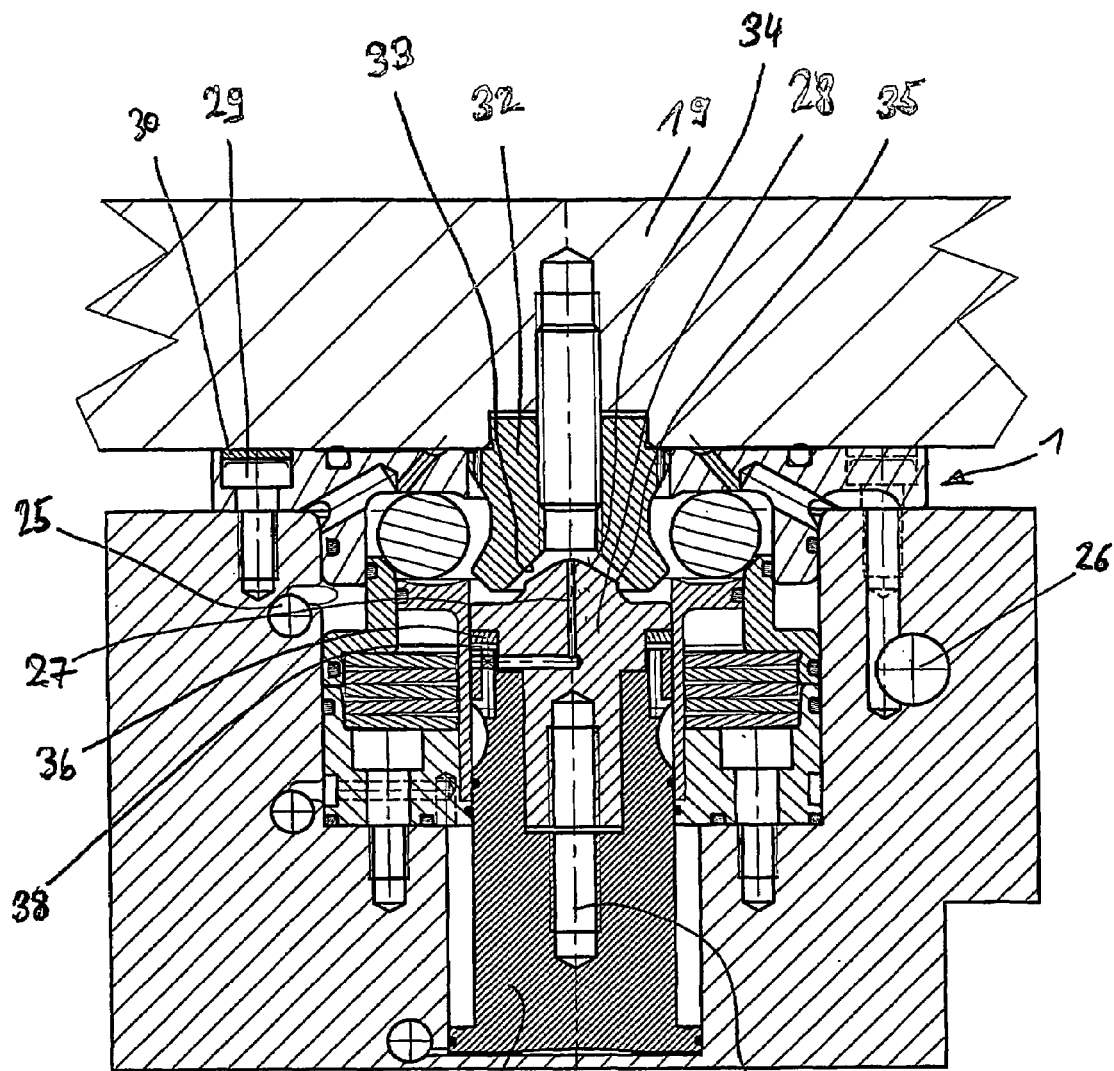
FIG. 3: shows an embodiment that has been modified from FIG. 2, comprising a blowing-air supplied lifting piston and turbine wheel.
Figure 4:
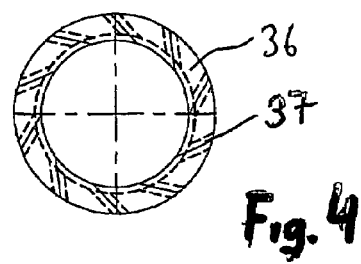
FIG. 4: shows the top view of the turbine wheel.
Figure 5:
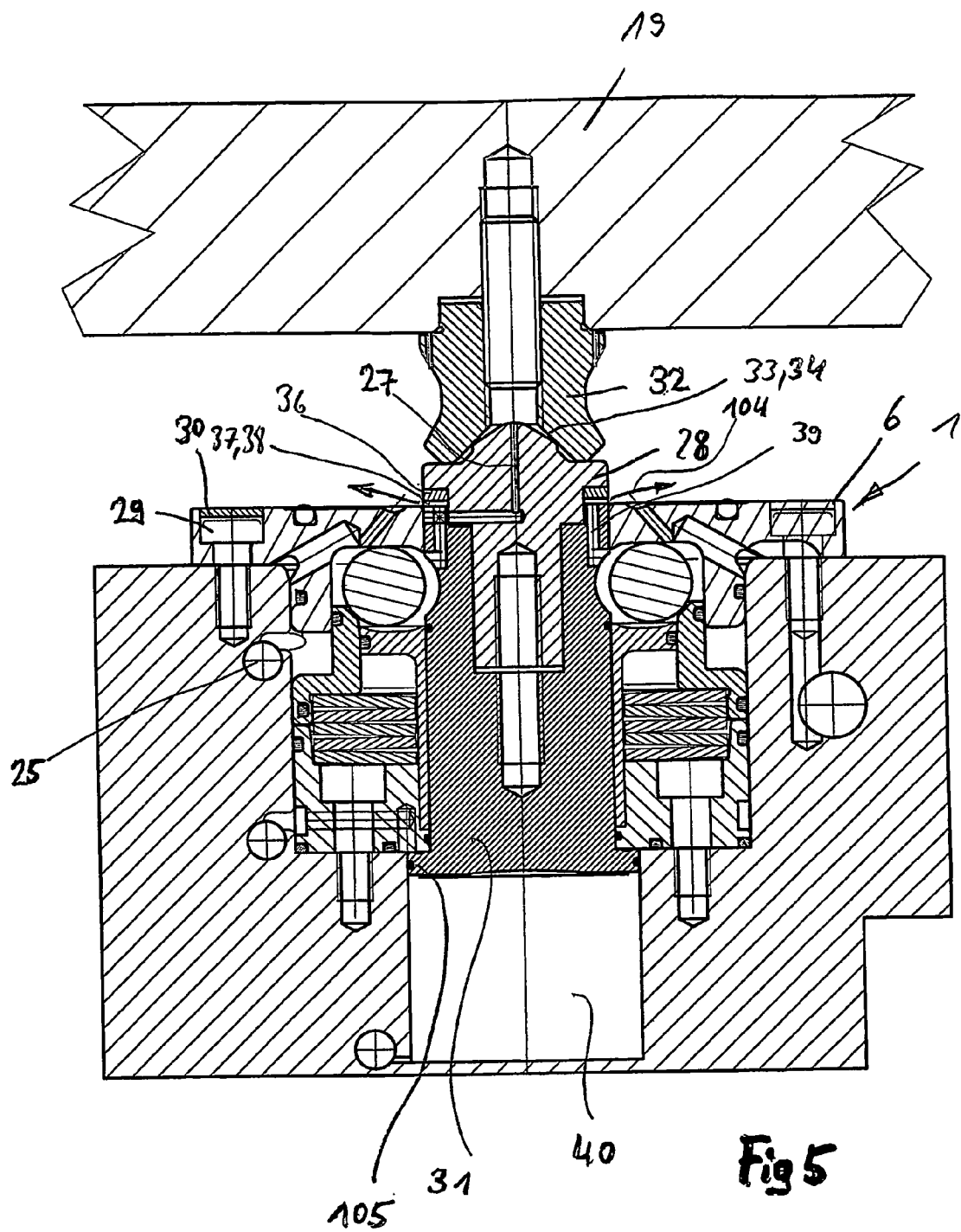
FIG. 5: shows the arrangement of FIG. 3 in the moved-out condition.

FIGS. 3, 4 and 5 show, as an additional example embodiment, that the lifting piston 31 may also be composed of several parts. In the depicted example embodiment, the upper part of the lifting piston 31 consists of a wear insert 28, which is firmly connected by means of a corresponding screw to the other part of the lifting piston 31. The two-part embodiment of the lifting-piston 31 has the advantage that the wear insert 28 is easily exchanged and can be quickly replaced if it is damaged. It may therefore be produced of a hard material in order to be paired with a correspondingly hard material of the pull-in nipple 2.

The material of the pull-in nipple 32 in this case must be selected such, in comparison to the material of the wear insert 28, that the pull-in nipple 32 is not damaged but the wear insert 28 is subject to possible damage and can then be quickly replaced.

The quick replacement of the wear insert 28 is accomplished simply by rotating is out of its fastening attachment to the locking screw 103.

In the example embodiment according to FIGS. 3, 4 and 5 it is also essential that a turbine wheel 36 that is driven in rotation is disposed in the lifting piston 31. Through the air supply port 26, compressed air is blown in, which, in the moved-out condition of the lifting piston (see FIG. 5) drives the turbine wheel in fast rotation. The turbine wheel, according to FIG. 4, consists of a part that is supported rotatable in an annular recess and which, according to FIG. 4, has inclined bores 37 or grooves facing outward at an incline in such a way that this creates downwardly directed turbine vanes 38 that are supplied with air by the blowing air from the port 26. A supply with cooling agent via the port 26 is possible as well. As soon as the lifting piston 31 is moved into its position according to FIG. 5 above the top surface of the cover, the blowing air reaches the outside in the direction of the arrow 104 via the radially outwardly directed bores, and the top surface of the cover 6 is cleaned off accordingly and freed from contaminations and shavings.

At the same time the blowing air also moves via the previously mentioned ascending channel 27 into the intermediate space between the pull-in nipple 32 and the associated surface on the wear insert 28, so that this surface is kept free from contaminations as well.

In other respects FIG. 5 provides for a blowing-air supply to the turbine wheel 36 via the air channel 39 only if the wear tip 28 is situated in the moved-out position according to FIG. 5. In the other case—see FIG. 3—a seal is created so that in this case the turbine wheel 36 is not supplied with air. This means that an air-flow connection to the turbine wheel 36 via the air channel 39 is created only when the turbine wheel is located approximately slightly elevated above the surface area 6. At the same time the lifting piston 31 then rests with a projection 105 of enlarged diameter against an associated stop face at the base end of the rapid-action coupling cylinder 1.

This ensures a perfect centering between the pull-in nipple 32 and the wear insert 28, because all surfaces that are prone to contaminations are cleaned off with blowing air and/or cooling agent.

Additionally it is shown that the screws 29 on the cover are also covered by top cover plates 30 in order to keep this region free from contaminations as well.

It is also possible, of course, to design corresponding glue covers in lieu of the cover plates 30.

Since the lifting piston 31 according to FIGS. 3 to 5 carries a wear insert 28, it will be marked with the reference numeral 31, whereas the lifting piston according to FIG. 2 without wear insert is marked with the reference numeral 21.

To additionally keep dirt away from the corresponding surfaces between the pull-in nipple 32 and wear insert 28 of the lifting piston 31, provision is made for an annular circumferential nose-shaped projection 35 to be provided in the region of the conical tip 34 of the lifting piston. The projection 35—which is nose-shaped in cross section—comes to rest against the corresponding conical incline in the region of the conical recess 33 on the pull-in nipple 32 and reams this conical recess 33 when the two pieces are in contact.

If shavings should form in this region, these shavings are then chopped and disintegrated by this nose-shaped projection 35 and also reliably removed by the subsequent blowing-air cleaning.

Figure 6:
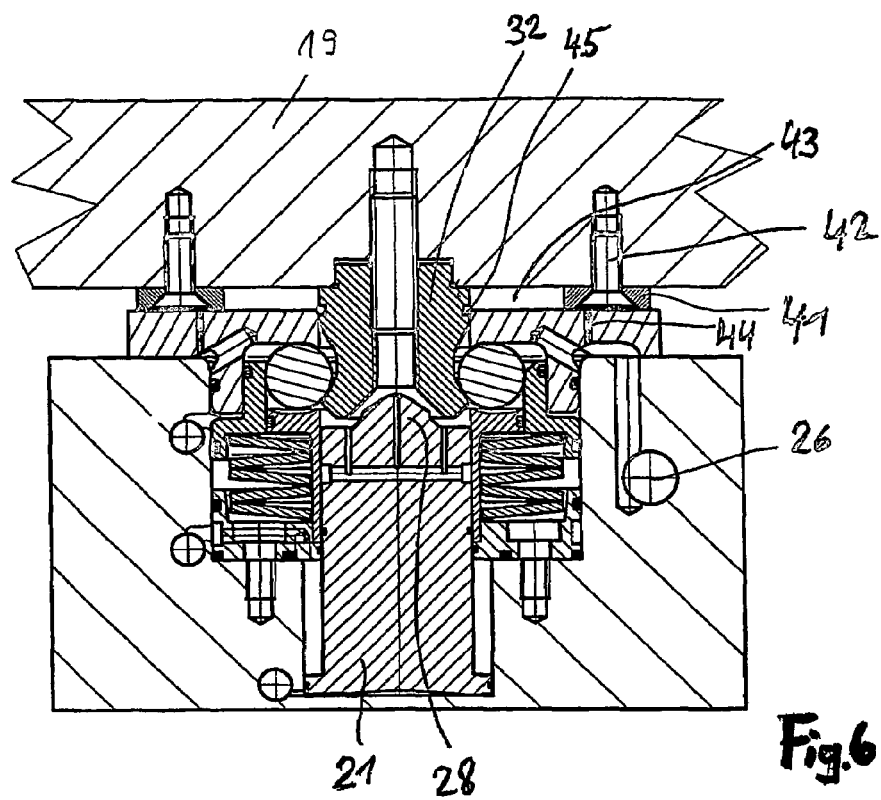
FIG. 6: shows a simplified embodiment as compared to FIGS. 3 and 5, with sealing-air monitoring in the locked condition.
Figure 7:
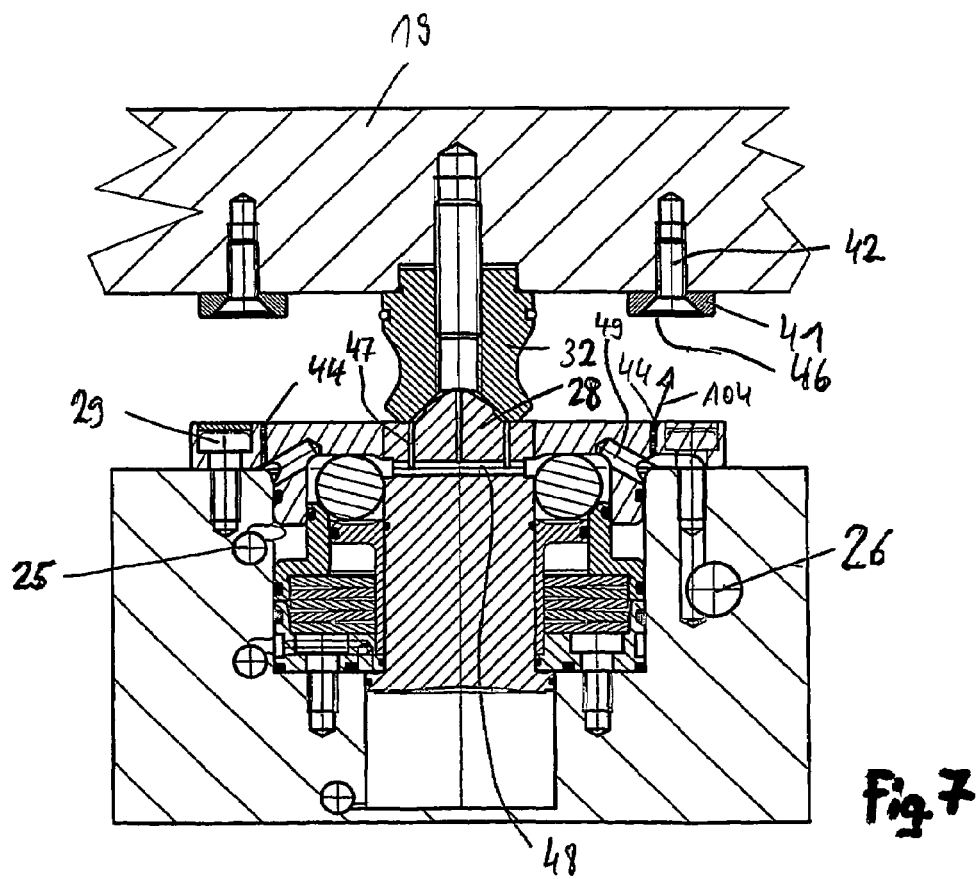
FIG. 7: shows the arrangement according to FIG. 6 in the unlocked condition.

FIG. 5 shows that the lifting piston 31 is driven displaceably inside the center recess 40 of the rapid-action coupling cylinder 1. FIGS. 6 and 7 show a simplified embodiment as compared to the above-mentioned embodiment according to FIGS. 3 and 5, because the turbine wheel 36 is eliminated there. However, this embodiment shows that the underside of the workpiece pallet 19 is kept free from contaminations as well, because provision is made for the underside not to rest level and flat on the top surface of the cover 6, but for a clearance 43 to be created between the two parts. This clearance is created by hardened support discs 41 that are fastened to the underside of the workpiece pallet 19 by means of screws 42. This creates, in the region of the clearance 43, an air-conducting space through which blowing air or cooling agent passes and which can, accordingly, be kept free from contaminations.

In order to prevent contaminations from settling in the region of the support discs 41, provision is made for upwardly directed ascending bores 44 to be provided in the cover, which move blowing air to the underside of the support discs 41 before these are lowered onto the cover according to FIG. 7. This is illustrated by FIG. 7, in which it is apparent that blowing air is directed upward from the ascending bores 44 in the direction of the arrow 104 against the underside of the support discs 41.

At the same time FIGS. 6 and 7 also shows that the corresponding conical surfaces between the pull-in nipple 32 and wear insert 28 are rinsed by blowing air, as has been illustrated based on the previous example embodiments. For this purpose an annular gap 47 in particular exists in the region of the wear insert 28, through which the blowing air is moved via a cross bore 48 arranged beneath it.

FIG. 7 in other respects shows that the countersunk screws 42 on the support discs also form a free space 46 at their heads, creating an indentation, which is then also rinsed by the blowing air in the direction of the arrow 104.

At the same time FIG. 6 shows that disposed on the outer circumference of the pull-in nipple 32 is a sealing ring 45, which prevents leaks in this area. The reason being that an air space is to be maintained in the clearance 43 with a specific air overpressure, which serves for the sealing-air monitoring to be described below.

The sealing-air monitoring serves to monitor the seat, namely to monitor whether the workpiece pallet 19 is seated with the support discs 41 on the top surface of the cover 6 flat and level without angling and does not carry any contaminations. FIG. 6 shows for this purpose that the ascending bores 44 are directed toward the underside of the support discs 41. As soon as the workpiece pallet 19 has been placed flat and level and free from contaminations onto the top surface of the rapid-action coupling cylinder 1, the ascending bores 44 are thus sealed and an air overpressure is created in this manner in the region of the air supply at the ascending bores 44. This air overpressure is utilized to monitor the flat and level seat of the workpiece pallet 19.

It goes without saying that the air from the port 26 is routed via corresponding cross bores 49 into the interior of the rapid-action coupling cylinder 1 and serves not only for cleaning the corresponding surfaces of the lifting piston 21 but also supplies blowing air to additional further blow-out openings in the region of the cover 6 of the rapid-action coupling cylinder 1.

Figure 8:
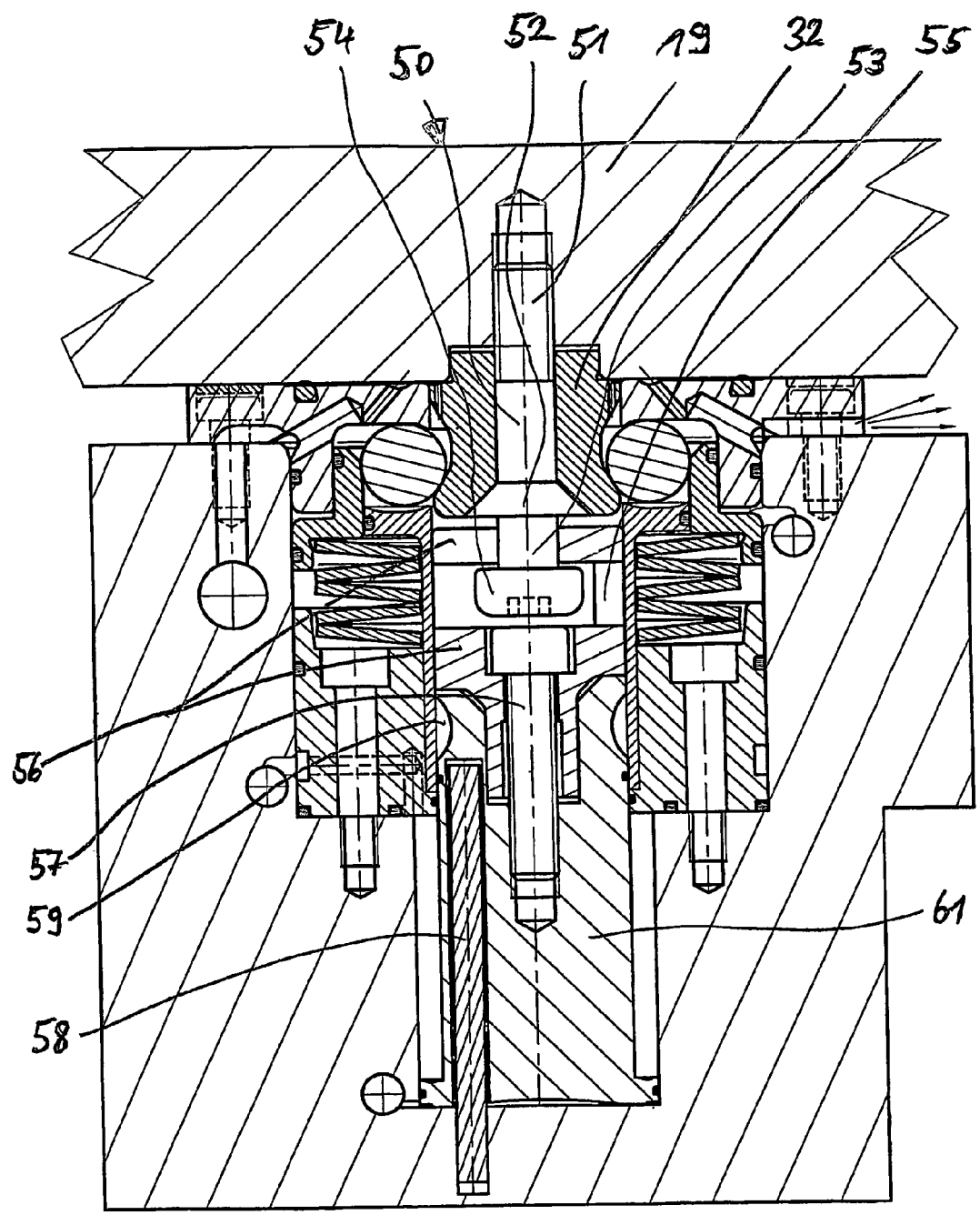
FIG. 8: shows an embodiment of a rapid-action coupling cylinder having a capturing device for vertical machines in a drawing plane that is rotated by 90 degrees.
Figure 9:
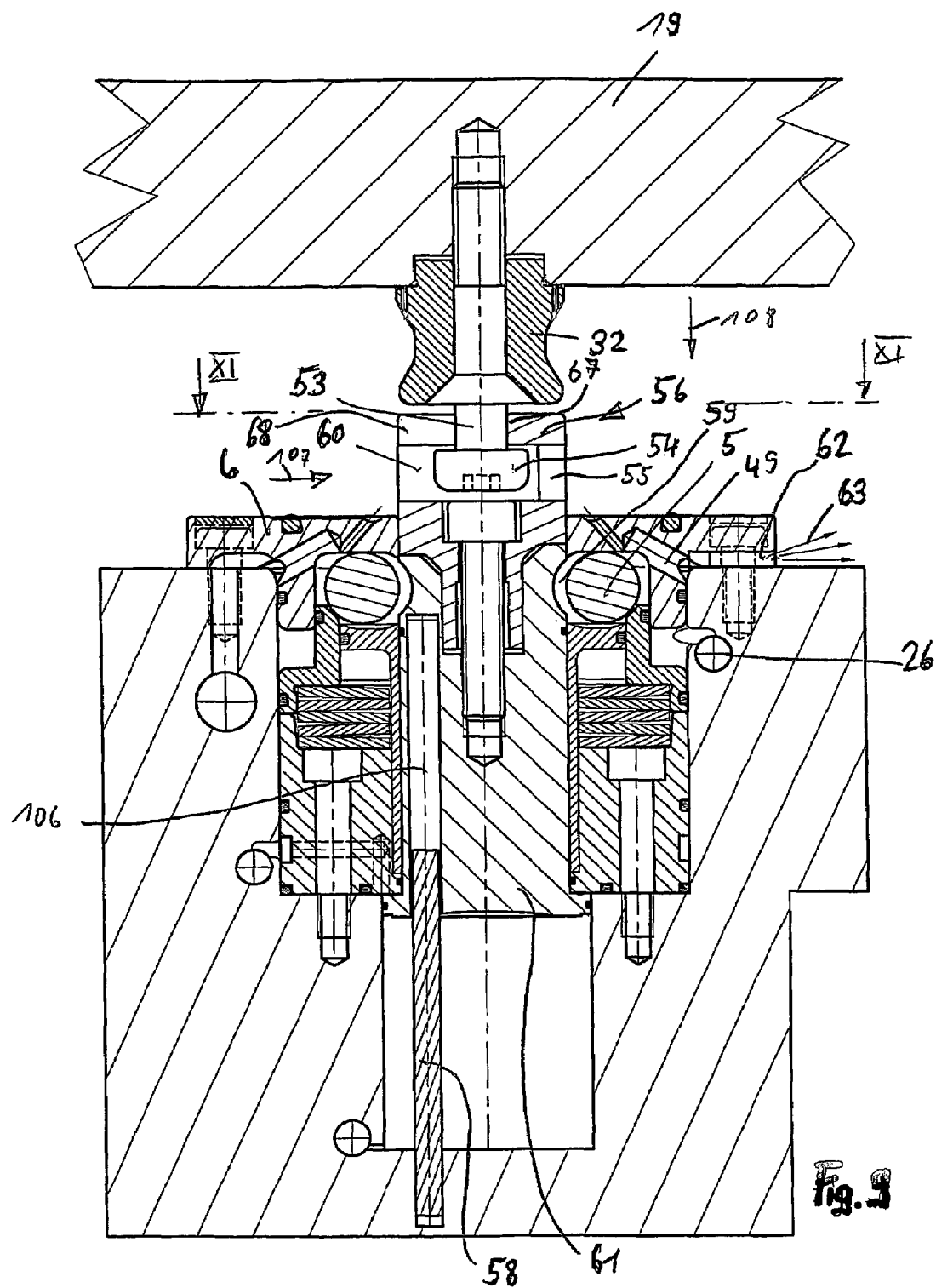
FIG. 9: shows the illustration according to FIG. 8 with the capturing device moved out.
Figure 10:
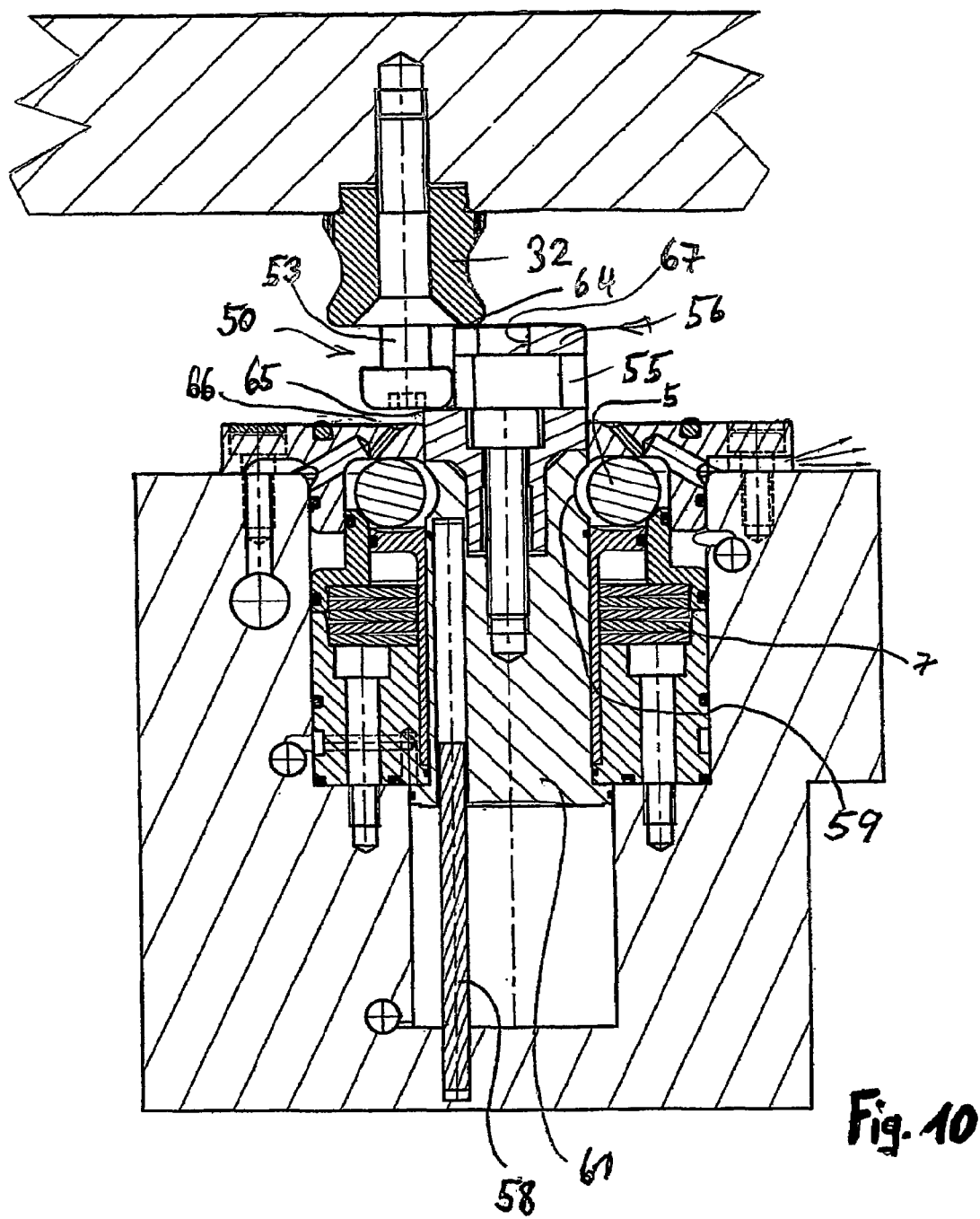
FIG. 10: shows the embodiment of FIGS. 8 and 9 with the capturing device disconnected.

FIGS. 8, 9 and 10 now show a capturing device for a workpiece pallet connected to a capturing device in a lifting piston 61. This example embodiment is suitable especially for a horizontal mounting of the rapid-action coupling cylinders 1. The rapid-action coupling cylinders may also be disposed at any random incline or in an overhead position, and it is always ensured through the capturing device to be described below that the workpiece pallet with the pull-in nipples 32 arranged thereon can be hooked onto the lifting piston without any damage, and then subsequently pulled in.

For ease of viewing, these devices are depicted in the drawings in a vertical orientation. In the true installed position, however, the drawing depiction must be imagined rotated by an angle of 90°, or a hanging or even downward facing installation situation may exist.

The capturing device substantially consists of a capture screw 50 that extends through the pull-in nipple 32 and which has a stepped shape with multiple steps.

In an axial extension to the existing countersunk head 52, a suspension neck 53 of reduced diameter is formed integrally, which in turn transitions into a capture head 54 of enlarged diameter. The entire capture screw 50 engages with a threaded bolt 51 into an associated thread on the underside of the workpiece pallet 19.

It is preferred if the capture screw 50 consists of one piece of the same material.

In another embodiment, however, provision may be made for the capture head 50 with the attached suspension neck 53 to carry an associated threaded bolt that is screwed into an associated receiving thread the region of the threaded bolt 51.

This allows for a retrofitting of a conventional pull-in nipple and fastening of the same to a workpiece pallet with a capture screw 50.

The depicted pull-in nipple 32 is not limited to the depicted embodiment, of course. A pull-in nipple 2 according to the previously described embodiments may be used as well.

FIG. 8 shows the capturing device in the capturing engagement, whereas FIG. 9 shows the capturing device in the connected condition, and FIG. 10 shows the capturing device in the disconnected condition.

In the pulled-in condition, the pull-in nipple 32 is thus moved by the lifting piston 61 into the interior of the rapid-action coupling cylinder 1 and held in place there. For this purpose the lifting piston 61 has an anti-twisting safeguard, which substantially consists of an anti-twisting pin 58 that engages into a corresponding longitudinally oriented bore 106 provided in the lifting piston 61. On the upper side of the lifting piston 61, a capturing element 56 is fixed by means of a screw 57, said capturing element forming a lateral capture opening 60, which defines a kind of keyhole-shaped opening having a lateral opening 55, through which dirt or water that may enter into the capture opening 60 can be removed.

FIG. 8 in other respects shows that at least one locking groove 59 is disposed on the outer circumference of the lifting piston 61, so that the lifting piston can also cooperate with the locking means of the rapid-action coupling cylinder 1.

This stage is presented in FIGS. 9 and 10.

FIG. 9 shows the unlocked position when the locking balls 5 are out of engagement with the locking groove 59 of the lifting piston 61.

In FIG. 9 the hooked-in position between the pull-in nipple 32 and capturing element 56 is depicted. In this position according to FIG. 9 the locking balls 5 are moved into the locking engagement with the locking groove 59 in order to ensure an uninterrupted capturing operation of the device. The reason being that provision is made for the workpiece pallet 19 to be moved in the direction of the arrow 107 with the capture head 54 disposed on it in the direction of the arrow 107 toward the laterally opened capture opening 60, so that the capture head 54 moves into this opening as shown in FIG. 9.

After the capture position according to FIG. 9 has been reached it is now possible to lower the workpiece pallet 19 in the direction of the arrow 108, during which process the lifting piston 61 performs the pull-in movement and, in the case of a horizontal position (perpendicular to the drawing position according to FIG. 9), dirt and water now runs from the downwardly directed opening 55 into the interior of the rapid-action coupling cylinder and the blowing air that is blown in via the port 26 enters, via the inclined bore 49, into a dirt discharge channel 62, where the contaminations are removed in the direction of the arrow 63.

This means that an automatic cleaning process takes place when the lifting piston 61 is moved out from the center recess in the rapid-action coupling cylinder, once it has reached its position in FIG. 9.

In the case of rapid-action coupling cylinders according to FIGS. 1 through 7 that are arranged horizontally on the machine table this is no problem, whereas in FIGS. 8 through 10 the mentioned dirt removal measures must be provided for horizontally arranged rapid-action coupling cylinders.

FIG. 10 shows that the capturing element 56 disposed on the lifting piston 61 moves out above the top surface of the cover 6. The purpose of this is to prevent that, when the pull-in nipple 32 is lowered—especially if a workpiece pallet 19 of heavy weight is lowered with a crane—the capture screw 50 will not sit on the top surface of the cover 6 and damage it. Provision is made, for this purpose, for the pull-in nipple to incorporate a lower stop face 64 that rests on the top surface of the capturing element 56. In this type of contact, the underside of the capture screw 50 still has a clearance 66 to the top surface of the cover, because the associated stop face 65 does not rest on the top surface of the cover 6.

In the connected condition (see FIG. 9), the suspension neck 53 then rests laterally against a corresponding stop face 67 in the capturing element 56.

Figure 11:
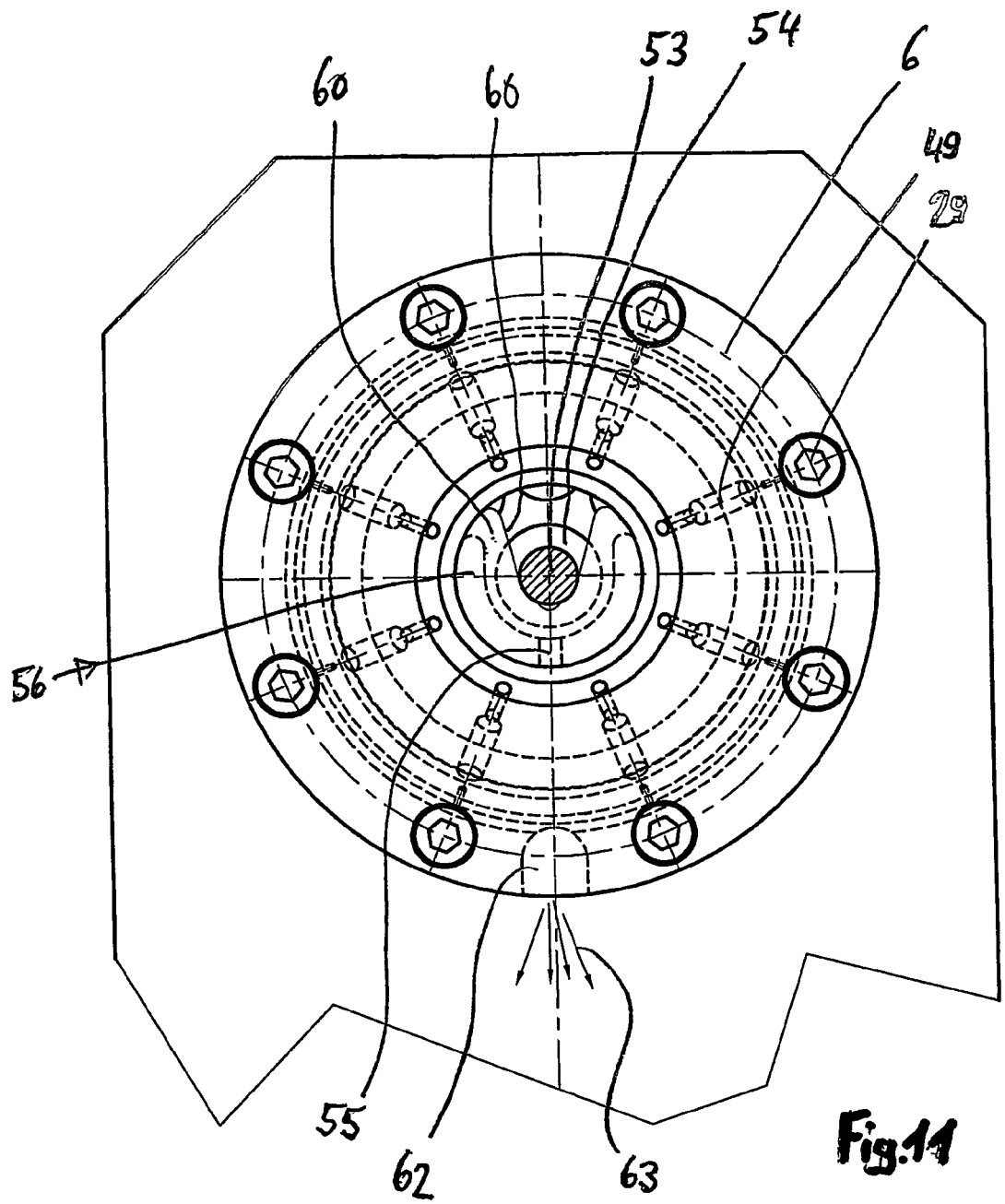
FIG. 11: shows the section along line XI-XI in FIG. 9.

FIG. 11 also shows additional details of the embodiment of the capturing element. It can be seen that the capturing element forms a lateral inlet slope 68, which has an enlarged diameter, in order to form a corresponding conical capture opening for the capture head 54.

FIG. 11 shows a section through the suspension neck 53, in which the capture head 54 of enlarged diameter is only partly visible because it already engages into the capture opening 60.

As the same time, FIG. 11 shows the previously mentioned sloped cross bores 49 that carry air and also supply this air to the screws 29.

At the same time FIG. 11 also shows, in the comparison 9, the function of the dirt discharge channel 62 through which the dirty water is removed in the direction of the arrow 63.

Figure 12:
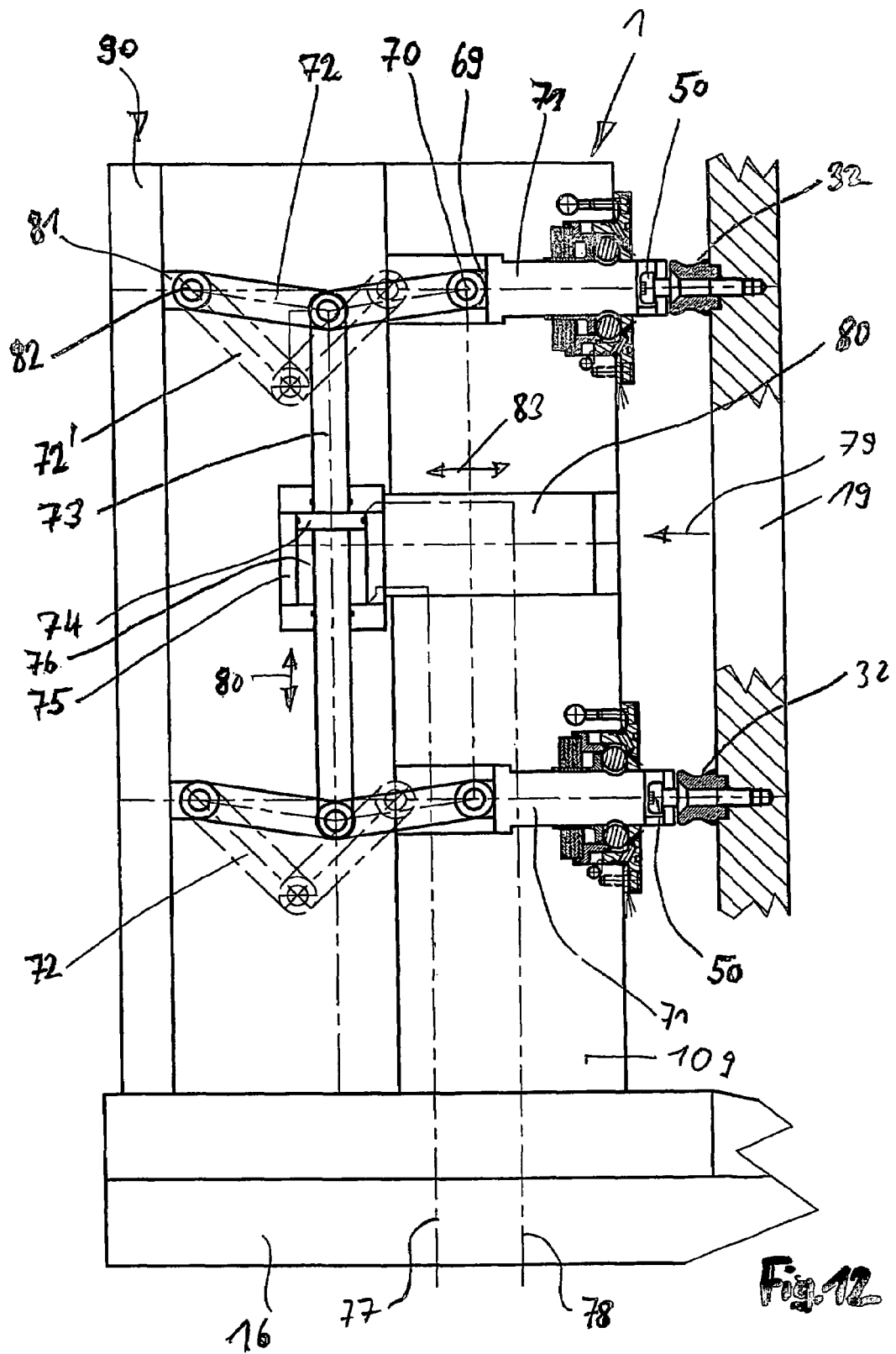
FIG. 12: shows the synchronous drive of capturing devices via a hydraulically operated articulated rod assembly.
Figure 13:
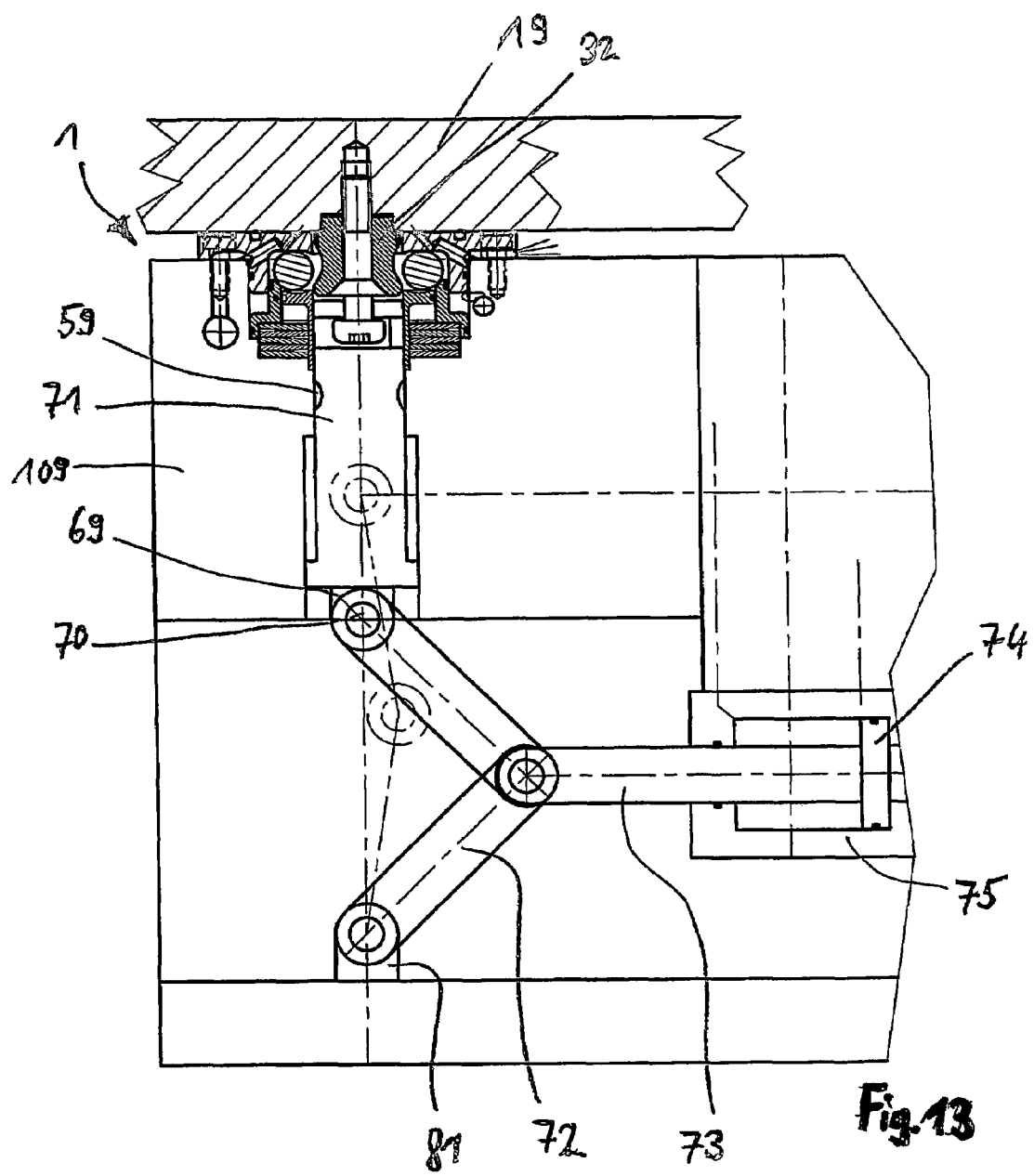
FIG. 13: shows an enlarged view of the illustration according to FIG. 12.

FIGS. 12 and 13 show a synchronously operated capturing device for the undamaged insertion of workpiece pallets with their pull-in nipples 32 into rapid-action coupling cylinders 1 that are disposed parallel with each another and aligned horizontally. This situation is particularly suitable for heavy workpiece pallets that are suspended with a weight of several tons from a crane hoist and that carry the risk that they can tip. The goal is to insert them into the horizontally aligned rapid-action coupling cylinders 1 in the direction of the arrow 79. For this purpose FIGS. 12 and 13 show that the capturing device is already connected and the capture screws 50 are in engagement with the capturing device of the lifting pistons 71 on the lifting pistons.

Provided are a series of lifting pistons 71 that are arranged parallel with each other and aligned horizontally, a bracket 69 being fixed on each lifting piston, which carries a swivel bolt 70 that is in connection with the one end of a toggle lever 72. The other end of the toggle lever 72 is fixed in a pivot bearing 82 and screw-on bracket 81 on the vertical portion of a horizontal tower 90. The horizontal tower 90 is arranged in this case on a machine table 16.

The number of lifting pistons 71 in combination with the number of rapid-action coupling cylinders 1 located above one another in the vertical direction or side by side in the horizontal direction is as desired. There also may be any desired number of displacement drives implemented through the rod assembly comprising the toggle levers 72 to be described below.

Acting upon the pivotable part of each toggle lever by means of a corresponding pivot bolt is the piston rod 73 of a cylinder 75 that is driven with a dual-action piston 74 inside a cylinder chamber 76 by a compressed oil. The compressed oil is supplied via the oil port 77 in the sense of an ejection movement and via the oil port 78 in the sense of a pull-in movement.

If is possible, of course, to implement the piston 74 not with a dual action but only with a single action and accomplish the return stroke by means of a spring, for example.

The synchronous displacement drive for the lifting pistons 71 is depicted in two different operating positions, with the locked position being shown in the dashed position, which is again depicted enlarged in FIG. 13. In this locked position the toggle lever 72 is articulated, because the piston 74 has moved into its corresponding end position in cylinder 75, and the lifting piston 71 is thus retracted into the interior of the rapid-action coupling cylinder, all rapid-action coupling cylinders 1 being embedded countersunk in an angle plate 109, this angle plate 109 being a component of the horizontal tower 19.

Also shown is that, in the unlocked position, the lifting piston 71 is lockable in the locking direction inside the rapid-action coupling cylinder.

FIG. 10 shows that the locking balls 5 of the rapid-action coupling cylinders are then in locking engagement with the locking groove 59 disposed on the circumference of the lifting piston 71. In this manner even heavy pallets can be placed onto the capturing device in a jerky movement, without causing damage to the rapid-action coupling cylinder or to the pull-in nipple. Additionally, this locking means reduces the load on the springs 7 in the rapid-action coupling cylinder 1 when the entire system is not in operation. The lifting piston 71 additionally covers the central interior recess of the rapid-action coupling cylinder 1 in the position shown in FIG. 10 so that in this embodiment as well no dirt can enter into the interior of the rapid-action coupling cylinder 1.

Because of the lateral displacement of the toggle rod assembly during the actuation—see the dashed lines in FIG. 12—it is necessary to implement the entire drive cylinder 75 displaceable in the direction of the arrows 83. The cylinder 75 is held for this purpose in a shaft 80, which is displaceable in the style of a rotary transmission leadthrough in a recess in the angle plate 109.

In the displaced condition, the oil feed to the cylinder 75 can thus be ensured in each case via the ports 77, 78.

Some machines do not have an oil supply so that a corresponding drive by means of a hydraulic cylinder 75 does not exist. This is where the example embodiment according to FIGS. 14 through 18 comes into play.

Figure 14:
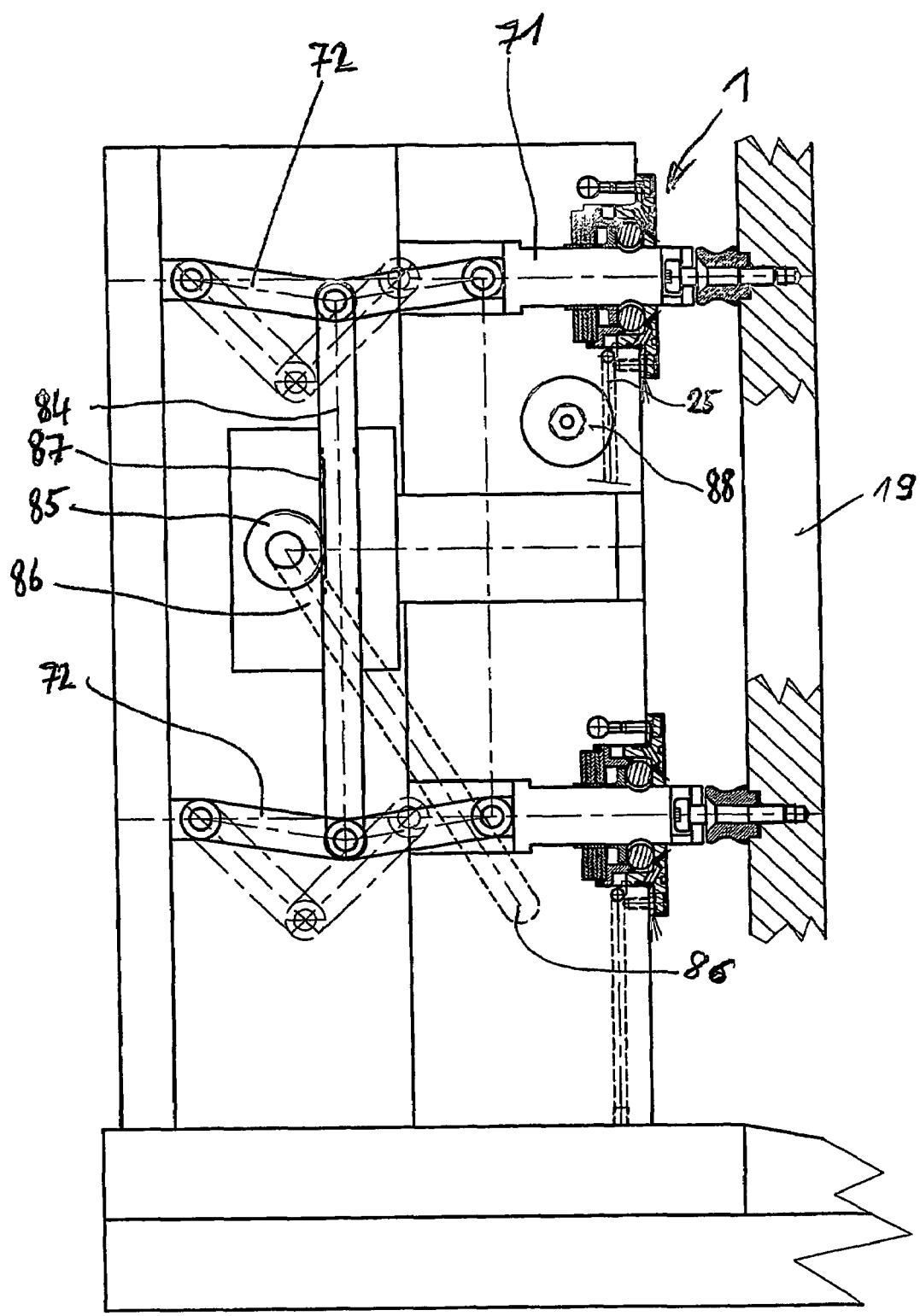
FIG. 14: shows an example embodiment that has been modified from FIG. 12, comprising a manual drive for the capture rod assembly.
Figure 15:
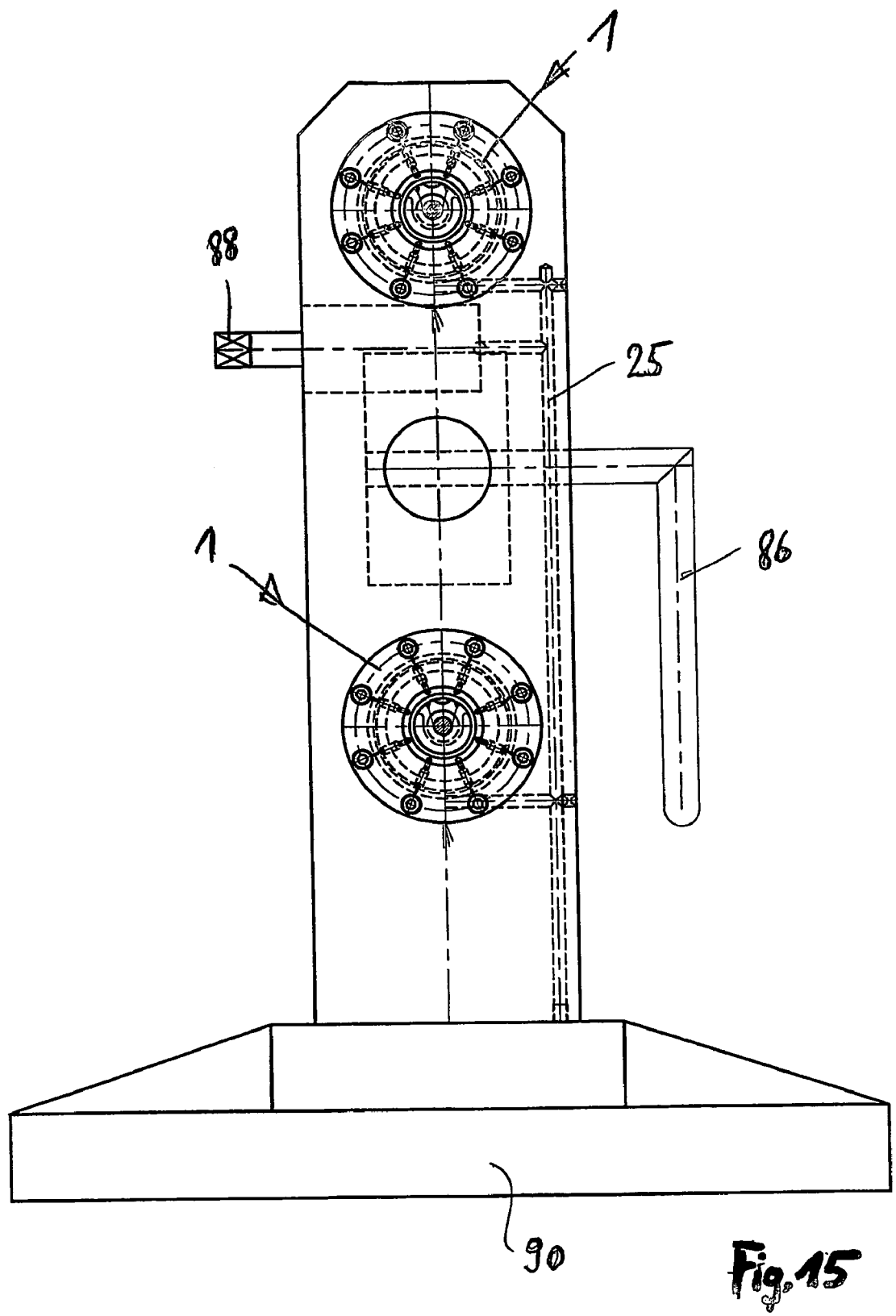
FIG. 15: shows the front view of the arrangement according to FIG. 14.

The example embodiment according to FIGS. 14 and 15 shows that a synchronous displacement drive can also be implemented by means of a manually operated toothed rack 84. The toothed rack 84 has a toothing 87 against which rests the exterior toothing of a pinion 85, which is freely rotatable by means of a hand lever 86. In this manner the toothed rack 84 can be moved back and forth, which also effects a deflection of the toggle levers 72 and corresponding displacement operation of the lifting pistons 71.

In other respects, the same descriptions apply to the same components as indicated above.

An additional manually operated screw-type pump 88 may also be provided, whereby the compressed-oil supply is provided to the locking means of the individual rapid-action coupling cylinders 1.

FIG. 15 shows the top view of the arrangement according to FIG. 14 with the workpiece pallet being removed.

FIGS. 16 through 18 show an entirely passive displacement drive for the lifting pistons 61 since these are displaceable only passively in the angle plate 109 without the same having an associated active displacement drive. In the case of small machines it is not necessary for a synchronous displacement drive to exist, especially if also light-weight workpiece pallets are used. The workpiece pallet can then be hooked into the corresponding capturing device by hand and simply displaced in the direction of the arrow 79, causing the workpiece pallet 19 to be transported from its offset position according to FIG. 16 into the locked position according to FIG. 17. In this case it is, therefore, only a matter of firmly pushing the pull-in nipples of the workpiece pallet into the associated rapid-action coupling cylinders, whereby, due to the utilized capturing device and above-described centering measures, a precise guiding is ensured with a damage-free insertion of the pull-in nipples into the rapid-action coupling cylinders.

Figure 19:
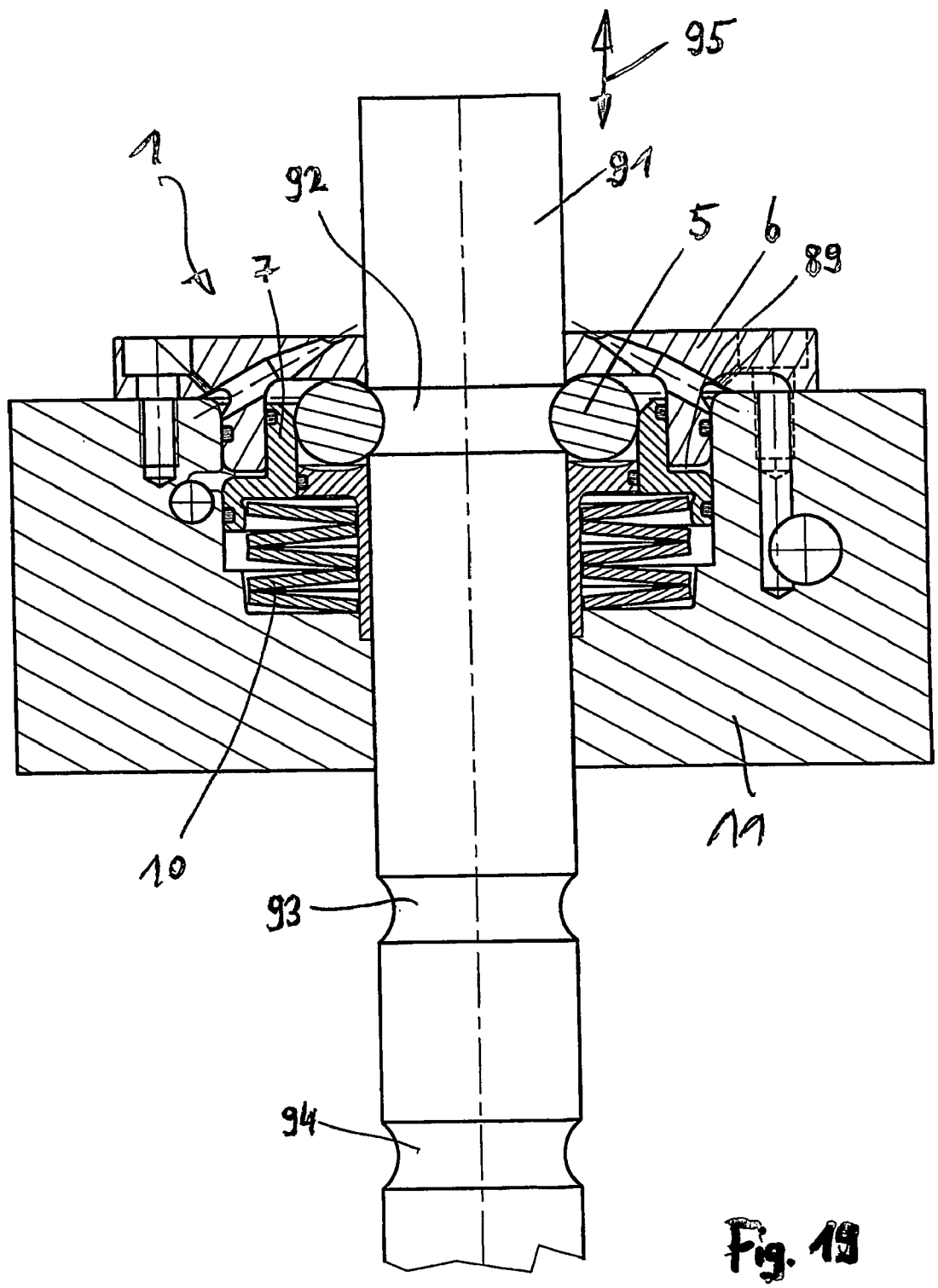
FIG. 19: shows an example embodiment for locking a machine shaft in a rapid-action coupling cylinder for the highly precise positioning of the displacement position of this machine shaft.
Figure 20:
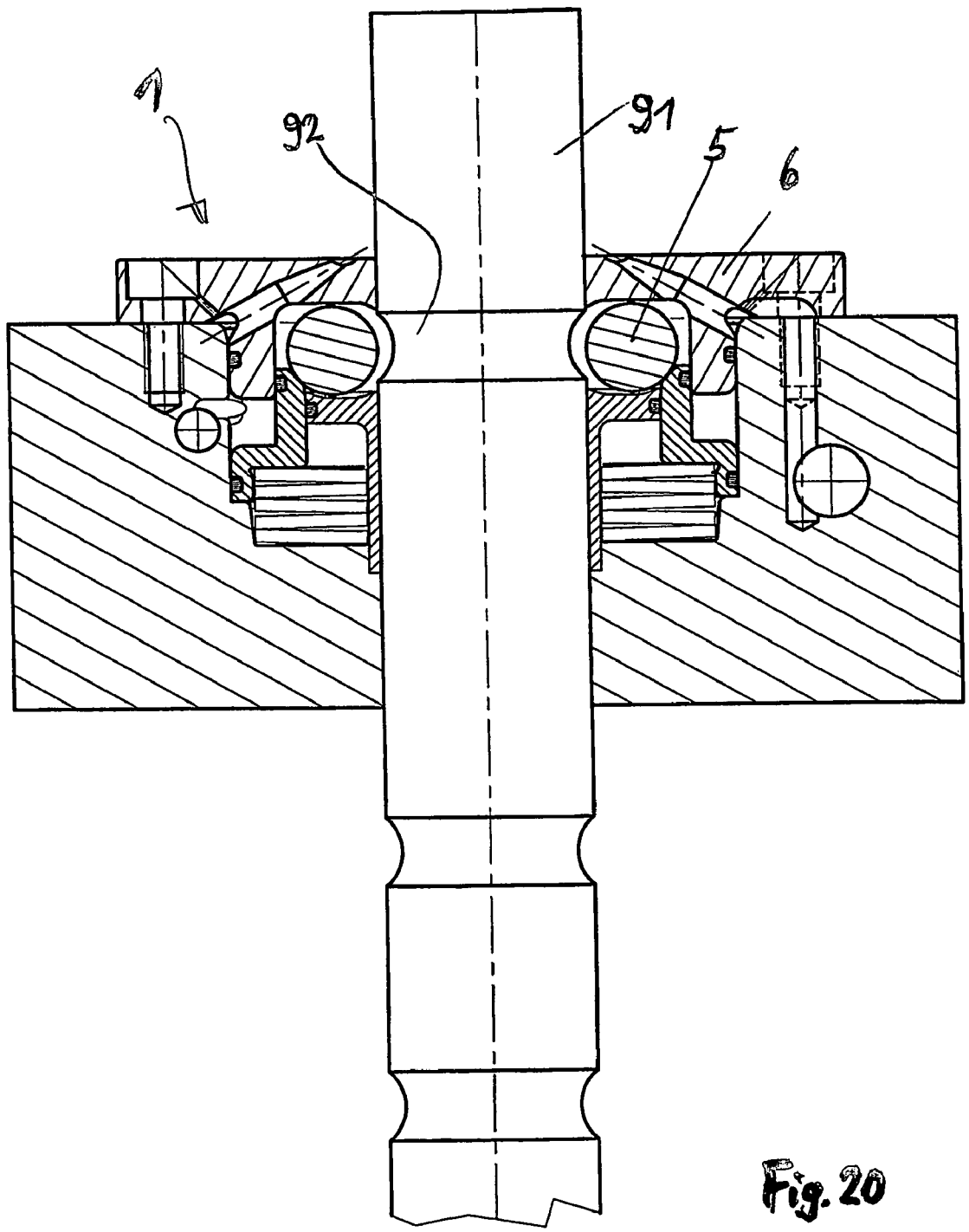
FIG. 20: shows the same presentation as FIG. 19 with the device unlocked.
Figure 21:
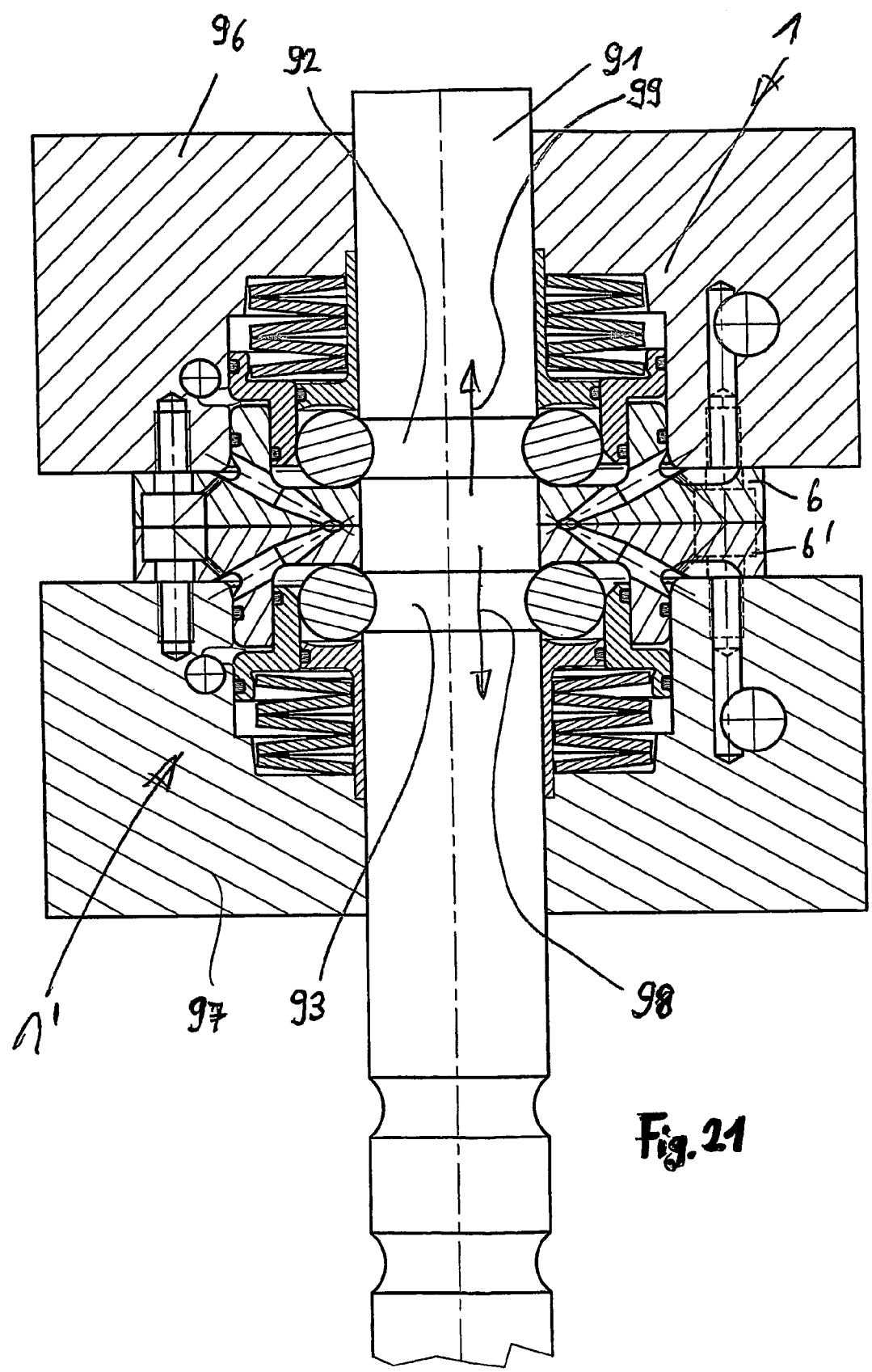
FIG. 21: shows an example embodiment that has been modified in detail from FIGS. 19 and 20, comprising two rapid-action coupling cylinders acting in opposite directions to clamp-in the machine shaft.

FIGS. 19 through 21 show the application of a generalized invention principle to a random machine shaft 91. The reason being that the previously described principles refer to a central passage being created inside a rapid-action coupling cylinder 1, in which the lifting pistons 31, 61, 71 can be arranged displaceable or passively adjustable. Picking up on this idea, it is also possible according to the example embodiment according to FIGS. 19 and 21 to provide, in lieu of a lifting piston, a machine shaft that is displaceable in the direction of the arrows 95 and which is arranged lockable and unlockable by means of the rapid-action coupling cylinder 1.

For this purpose the machine shaft 91 has one or a plurality of locking grooves 92, 93, 94 arranged parallel with each other at an axial distance from each other, which are selectively engageable with the locking means of the rapid-action coupling cylinder.

FIG. 19 shows the locked condition of the locking balls 5 to the locking groove 92, whereas FIGS. 20 shows the unlocked condition.

In expansion of this proposed solution, FIG. 21 shows that it is also possible to use two rapid-action coupling cylinders 1, 1', facing in opposite directions, wherein each rapid-action coupling cylinder creates an opposite pull-in force with the locking balls 5. It is possible in this case to have two machine parts 96, 97 penetrated by the machine shaft 91, and when the locking balls engage into the locking groove 92 a pull-in force in the direction of the arrow 99 is created in the process, while an opposite pull-in force 98 is created when the locking elements engage into the locking groove 93. In this manner the machine shaft 91 is clamped-in with a high and opposite biasing force by means of two oppositely oriented rapid-action coupling cylinders, resulting in an absolutely precisely positioned clamping of a machine shaft 91 between two machine parts 96, 97, which is protected against shifting.

This indirectly also precisely clamps the machine parts 96, 97 relative to one another. A clamping of this type may be used for random clamping tasks. These clamping tasks may be used, for example, for closing molds for injection molding machines, and the like.

It is also possible according to the example embodiment of FIG. 20, to apply less than the full locking force to the locking groove 92, i.e., the locking balls 5 do not necessarily need to engage with the associated surfaces of the locking groove 92 in a form-fitting manner.

For this case, provision is made for the locking means to have a limit stop. The displacement force executed onto the piston 7 by the springs 10 in the displacement direction then causes the piston to bound against a specific stop face 89 so that the individual locking balls 5 do not come into form-fitting engagement with the locking groove 92. They then only guide the locking ball 92, and the entire machine shaft 91 is rotatable. The locking balls 5 then act as ball-bearing balls, and a ball bearing that can be opened and closed is proposed with these locking means, so that, for example, during a complete opening according to FIG. 20, another locking groove may be aimed for in such a way that the machine shaft 91 is displaced into a different displacement direction 95 and the locking groove 93, for example, then comes into engagement with the ball-bearing arrangement of the locking balls 5. In this manner an openable and closeable ball bearing can be created for the rotary support of the machine shaft 91 by means of an appropriate actuation of the piston 7.

A rotatable and displaceable ball bearing has thus been put into practice.

DRAWING LEGEND 1 rapid-action clamping cylinder
2 pull-in nipple
3 capture tip
4 receiving aperture
5 locking balls
6 cover
7 piston
8 ball bearing cup
9 lower spring support
10 spring
11 housing
12 pressurized-agent port
13 pressure chamber
14 screw
15 clamping bracket
16 machine table
17 conical bevel
18 conical receptacle
19 workpiece pallet
20 locking screw
21 lifting piston
22 conical recess
23 port for raising
24 port for lowering
25 port for unlocking
26 port for blowing air
27 ascending channel
28 wear insert
29 screw
30 cover plate
31 lifting piston
32 pull-in nipple 33 conical recess
34 conical tip
35 projection
36 turbine wheel
37 sloped bore
38 turbine vane
39 air channel
40 recess
41 support disc
42 screw
43 clearance
44 ascending bore
45 sealing ring
46 free space
47 annular gap
48 cross bore
49 cross bore
50 capture screw
51 threaded bolt
52 countersunk head
53 suspension neck
54 capture head
55 opening
56 capturing element
57 screw
58 anti-twisting pin
59 locking groove
60 capture opening
61 lifting piston
62 dirt discharge channel
63 direction of arrow
64 stop face
65 stop face
66 clearance
67 stop face
68 inlet slope
69 bracket
70 swivel pin
71 lifting piston
72 toggle lever
73 piston rod
74 piston
75 cylinder
76 cylinder chamber
77 oil port (ejection)
78 oil port (pull-in)
79 direction of arrow
80 shaft
81 screw-on bracket
82 pivot bearing
83 direction of arrow
84 toothed rack
85 pinion
86 hand lever
87 toothing
88 screw-type pump
89 stop face
90 horizontal tower
91 machine shaft
92 locking groove
93 locking groove
94 locking groove
95 directions of arrow
96 machine part
97 machine part
98 pull-in force
99 pull-in force
100 locking groove
101 incline
102 radius
103 locking screws
104 direction of arrow
105 projection
106 bore
107 direction of arrow
108 direction of arrow
109 angle plate

What is claimed is:

1. A rapid-action coupling cylinder comprising:
a guiding device which controls insertion of a pull-in nipple (2) fixed to the underside of a workpiece pallet (19) into a central receiving aperture in a housing (11) of the rapid-action coupling cylinder (1),
wherein a front face on a free end of the pull-in nipple (2) has, in the direction of insertion, a conical bevel (17) that is beveled toward the rear, which cooperates with an associated and oppositely beveled conical receptacle (18) in the housing (11);
wherein an inner beveled circumference of the receiving aperture (4) on a cover of the housing (11) has an inlet radius (102) that engages the conical bevel (17) and guides the pull-in nipple (2) into the conical receptacle (18), and
wherein the conical receptacle (18) is formed by a upper ball bearing cup (8) and a lower spring support (9).

2. A rapid-action coupling cylinder according to claim 1, wherein the conical receptacle (18) disposed in the housing (11) is fixed to the housing.

3. A rapid-action coupling cylinder according to claim 1, wherein an air-carrying space is formed on an underside of the workpiece pallet (19).

4. A rapid-action coupling cylinder according to claim 1, wherein a sealing-air monitoring is provided for monitoring a flat and level seat of the workpiece pallet (19) on a top surface of the cover (6).

5. A rapid-action coupling cylinder according to claim 1, wherein multiple pull-in nipples that are arranged parallel with each other on the underside of the workpiece pallet, wherein a capturing device is assigned to each pull-in nipple in a separate rapid-action coupling cylinder, wherein all capturing devices are driven synchronously.

6. A rapid-action coupling cylinder according to claim 5, wherein the lifting pistons (71) that are connected to the capturing device in each case are mechanically connected to each other by means of a toggle-lever rod assembly (70, 72, 81, 82).

7. A rapid-action coupling cylinder comprising:
a guiding device which controls insertion of a pull-in nipple (2) fixed to the underside of a workpiece pallet (19) into a central receiving aperture in a housing (11) of the rapid-action coupling cylinder (1), wherein a free end of the pull-in nipple (2) has a recessed conical receptacle (33) that engages an associated and oppositely beveled conical tip (34) in the housing (11), wherein the oppositely beveled tip (34) disposed in the housing is fixed on a lifting piston that is arranged raisable and lowerable in the housing.

8. A rapid-action coupling cylinder according to claim 4, in a region where the pull-in nipple (2) and the lifting piston make contact, the corresponding contacting and associated surfaces are kept free from contaminations.

9. A rapid-action coupling cylinder according to claim 8, wherein the lifting piston has blowing-air openings or cooling agent openings that are directed towards associated surfaces of the pull-in nipple (2).

10. A rapid-action coupling cylinder according to claim 9, wherein the lifting piston (21) is composed of several parts and that an upper part thereof consists of an exchangeable wear insert (28).

11. A rapid-action coupling cylinder according to claim 9, wherein disposed in the lifting piston is a turbine wheel (36) that is driven in rotation.

12. A rapid-action coupling cylinder according to claim 9, wherein in a region of the conical tip of the lifting piston, an annular projection (35) with nose-shaped cross section is provided that chops shavings that enter into the intermediate space between the pull-in nipple (2) and lifting piston (31).

13. A rapid-action coupling cylinder according to claim 9, wherein between the pull-in nipple (2) and the lifting piston (21, 31, 61, 71) disposed in the interior of the rapid-action coupling cylinder, a capturing device (50, 53, 54, 56) is arranged which mechanically connects the pull-in nipple to the lifting piston.

14. A rapid-action coupling cylinder according to claim 7, wherein the recessed conical receptacle (33) disposed in the housing (11) is fixed to the housing.

15. A rapid-action coupling cylinder according to claim 7, wherein a sealing-air monitoring is provided for monitoring a flat and level seat of the workpiece pallet (19) on a top surface of the cover (6).

* * * * *